US010173371B1

(12) United States Patent
Evens et al.

(10) Patent No.: US 10,173,371 B1
(45) Date of Patent: Jan. 8, 2019

(54) SYSTEM AND METHOD FOR FORMING A BONDED JOINT

(71) Applicant: The Boeing Company, Chicago, IL (US)

(72) Inventors: Michael Walter Evens, Burien, WA (US); John F. Spalding, Renton, WA (US); Megan Nicole Watson, Kent, WA (US); Allan Joshua Slocum, Seattle, WA (US); Joel Patrick Baldwin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 15/250,734

(22) Filed: Aug. 29, 2016

Related U.S. Application Data

(62) Division of application No. 14/041,188, filed on Sep. 30, 2013, now Pat. No. 9,427,911.

(51) Int. Cl.
*B29C 65/00* (2006.01)
*B32B 37/00* (2006.01)
*B29C 65/48* (2006.01)
*B29C 65/02* (2006.01)
*B29L 31/24* (2006.01)

(52) U.S. Cl.
CPC ............ *B29C 65/48* (2013.01); *B29C 65/02* (2013.01); *B29L 2031/24* (2013.01)

(58) Field of Classification Search
CPC ......... B29C 65/00; B29C 65/02; B29C 65/48; B29C 65/485; B29C 65/4835; B29C 65/4845; B29C 65/56; B29C 65/562; B29C 65/78; B29C 65/782; B29C 66/00; B29C 66/0012; B29C 66/00145; B29C 66/40; B29C 66/41; B29C 66/47; B29C 66/472; B29C 66/80; B29C 66/81; B29C 66/812; B29C 66/814; B29C 66/8141; B29C 66/8145; B29C 66/83; B32B 37/00; B32B 37/10; B32B 37/04; B32B 37/06; (Continued)

(56) References Cited

U.S. PATENT DOCUMENTS 6,388,724 B1 * 5/2002 Campbell ............ G02F 1/1303
349/122
9,308,688 B1 4/2016 Evens et al.
(Continued)

OTHER PUBLICATIONS

Office Action, dated Aug. 13, 2015, regarding U.S. Appl. No. 14/041,188, 12 pages.
(Continued)

*Primary Examiner* — Jacob T Minskey
*Assistant Examiner* — Matthew Hoover
(74) *Attorney, Agent, or Firm* — Yee & Associates, P.C.

(57) ABSTRACT

A method and apparatus for forming a bonded joint on a composite structure is presented. An apparatus carrying a first workpiece is positioned relative to a second workpiece. A vacuum is applied to the first workpiece and a portion of the second workpiece. A bladder on a first surface of a housing of the apparatus is deflated. Deflating the bladder positions the first workpiece such that adhesive having a desired thickness is positioned between the first workpiece and the second workpiece. The adhesive positioned between the first workpiece and the second workpiece is cured.

19 Claims, 19 Drawing Sheets

(58) Field of Classification Search
CPC .............. B32B 37/1018; B32B 37/12; B32B 2037/1215; B32B 2037/053
See application file for complete search history.

(56) References Cited

U.S. PATENT DOCUMENTS

| | | |
|---|---|---|
| 9,427,911 B1 | 8/2016 | Evens et al. |
| 2012/0080135 A1 | 4/2012 | Evens et al. |
| 2012/0125534 A1* | 5/2012 | Watson .............. B29C 66/00145 156/285 |

OTHER PUBLICATIONS

Final Office Action, dated Nov. 30, 2015, regarding U.S. Appl. No. 14/041,188, 11 pages.
Notice of Allowance, dated Apr. 27, 2016, regarding U.S. Appl. No. 14/041,188, 10 pages.

* cited by examiner

SYSTEM AND METHOD FOR FORMING A BONDED JOINT

CROSS-REFERENCE TO RELATED APPLICATION(S)

This application is a divisional of and claims the benefit of priority to U.S. patent application Ser. No. 14/041,188, filed Sep. 30, 2013, the entire contents of which are incorporated herein by reference.

BACKGROUND INFORMATION

1. Field

The present disclosure relates generally to composite structures and, in particular, to reworking composite structures. Still more particularly, the present disclosure relates to a system and method for forming a bonded joint on a composite structure.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, lightweight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

In manufacturing composite structures, layers of composite material are typically laid up on a tool. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

The different layers of prepreg may be laid up in different orientations and different numbers of layers may be used depending on the thickness of the composite structure being manufactured. These layers may be laid up by hand or by using automated lamination equipment such as a tape laminating machine or a fiber placement system.

After the different layers of composite material have been laid up on the tool, the layers of composite material may be consolidated and cured upon exposure to temperature and pressure, thus forming the final composite structure. Thereafter, the composite structure may be inspected to determine whether inconsistencies are present, and, if no inconsistencies are identified, the composite structure may be put in service.

In some cases, inconsistencies may occur in composite structures during various stages of manufacturing and use. For example, inconsistencies in an aircraft composite structure may occur during manufacturing, transport, maintenance, in-service, or various other stages of use. Examples of inconsistencies that may be present in a composite structure include voids, porosity, delamination, foreign object debris (FOD), cracks, and other types of inconsistencies.

When inconsistencies are present, composite structures often need rework. The rework may include rework, replacement, or some combination thereof. For example, a portion of the composite structure may be replaced with a patch. In other instances, the composite structure may be discarded and replaced with a new composite structure.

This rework reduces the availability of aircraft carrying passengers, cargo, or other items. For example, a need for rework may ground an aircraft, resulting in flights being delayed or canceled. These effects may be more costly and time-consuming than desired. Moreover, flight delays and grounded aircraft may cause passenger dissatisfaction. Therefore, it would be desirable to have a method and apparatus that take into account at least some of the issues discussed above, as well as other possible issues.

SUMMARY

In one illustrative embodiment, a method is provided. An apparatus carrying a first workpiece is positioned relative to a second workpiece. A vacuum is applied to the first workpiece and a portion of the second workpiece. A bladder on a first surface of a housing of the apparatus is deflated. Deflating the bladder positions the first workpiece such that adhesive having a desired thickness is positioned between the first workpiece and the second workpiece. The adhesive positioned between the first workpiece and the second workpiece is cured.

In another illustrative embodiment, an apparatus comprises a housing, a bladder, and a carrier plate. The housing has a first surface and a second surface. The bladder is attached to the first surface of the housing. The carrier plate is attached to the first surface of the housing.

In yet another illustrative embodiment, an apparatus comprises a housing, a number of standoffs, a bladder, a carrier plate, and a vacuum bag. The housing has a number of vacuum ports. The number of vacuum ports extends from a second surface of the housing to a first surface of the housing. The housing comprises a body having a cavity and a cover plate. The cover plate is configured to cover the cavity and lie flush with the body. The number of standoffs is associated with the first surface of the housing. The number of standoffs is configured to extend outwardly a first distance from the first surface. The bladder is attached to the first surface of the housing. The bladder is configured to extend a second distance from the first surface. The second distance is a shorter distance than the first distance of the number of standoffs when the bladder is in a deflated state. The carrier plate is attached to the first surface of the housing. The carrier plate is comprised of a thermally conductive material and configured to be heated. The vacuum bag is sealed to the second surface of the housing and a second workpiece.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to provide a composite structure rework system that may be operated to rework composite structures without taking the aircraft out of service or removing composite parts from the aircraft. In particular, it may be desirable to rework an inconsistency in a composite workpiece by adhering a patch to the portion of the composite structure that contains the inconsistency. This patch may be commonly referred to as a doubler. In these illustrative examples, the patch may be a pre-cured sheet of composite material made from a layer of fiber reinforced with epoxy resin or made from metal material.

The illustrative embodiments also recognize and take into account that when reworking an inconsistency with a patch, an adhesive may be used to form a bonded joint between the patch and the underlying workpiece. This adhesive may be a paste adhesive. The use of a paste adhesive, however, may introduce inconsistencies into a bondline formed where the patch and the workpiece are bonded to each other. This bondline is present when the patch and the workpiece have been joined together and the paste adhesive is cured. These inconsistencies may include, for example, without limitation, voids, porosity, thickness variations, undesirable adhesive thickness, or a combination of inconsistencies within the bondline. When voids or porosity are present in a composite structure, the mechanical properties of that structure may not perform as desired.

Thus, the illustrative embodiments provide a method and apparatus for forming a bonded joint. An apparatus carrying a first workpiece is positioned relative to a second workpiece. A vacuum is applied to the first workpiece and a portion of the second workpiece. A bladder is deflated on a first surface of a housing of the apparatus. Deflating the bladder positions the first workpiece such that adhesive having a desired thickness is positioned between the first workpiece and the second workpiece. The adhesive positioned between the first workpiece and the second workpiece is cured.

Figure 1:
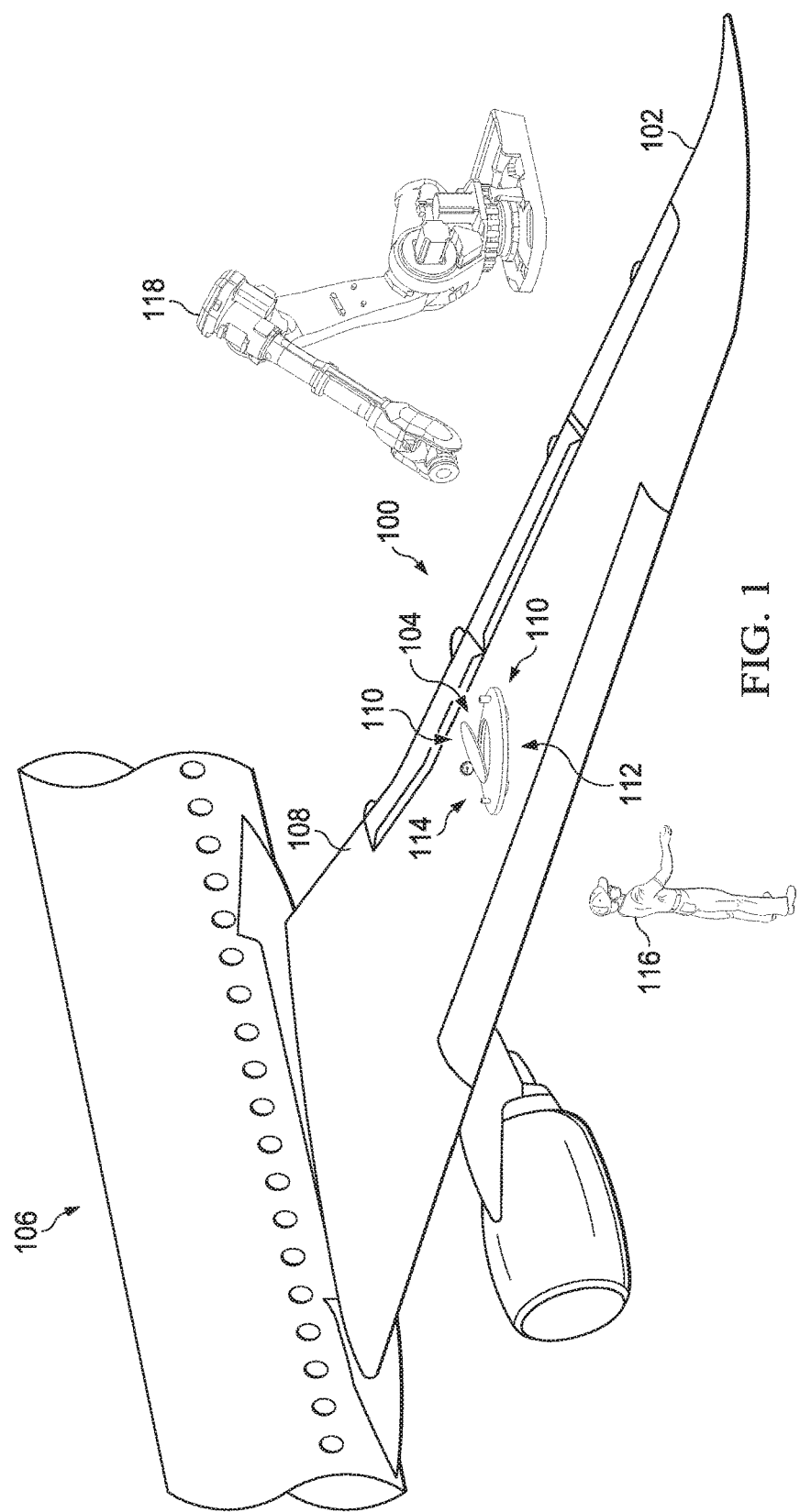
FIG. 1 is an illustration of a bonding environment in accordance with an illustrative embodiment.

Referring now to the figures and, in particular, with reference to FIG. 1, an illustration of a bonding environment is depicted in accordance with an illustrative embodiment. In this example, bonding environment 100 is shown with wing 102 and apparatus 104. Wing 102 may be part of aircraft 106 in this illustrative example.

As illustrated, wing 102 has surface 108. Surface 108 may include portion 110 with number of inconsistencies 112. As used herein, a "number of" items may be one or more items. For example, number of inconsistencies 112 may include one or more inconsistencies.

In these illustrative examples, number of inconsistencies 112 may include at least one of cracks, voids, delamination, foreign object debris, or other types of inconsistencies. As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this depicted example, apparatus 104 may be positioned above number of inconsistencies 112 on portion 110 of surface 108 of wing 102 to perform rework on number of inconsistencies 112. Apparatus 104 is configured to perform rework on number of inconsistencies 112 using a patch (not shown). In this example, the patch may comprise a number of plies.

Apparatus 104 is vacuum debulking tool 114 in this illustrative example. Vacuum debulking tool 114 is a device that uses vacuum pressure and heating to reduce porosity of adhesive formed between the patch and portion 110 of surface 108 of wing 102. Vacuum debulking tool 114 reduces porosity in the adhesive by drawing air and other gases from between the plies of the patch and the adhesive prior to compressing the patch to portion 110 of surface 108 of wing 102. This process is commonly referred to as "debulking." In this example, vacuum debulking tool 114 may then cure the adhesive to form a bonded joint.

In this depicted example, vacuum debulking tool 114 may be operated by human operator 116 or may be operated automatically. For example, vacuum debulking tool 114 may be positioned above number of inconsistencies 112 in portion 110 of surface 108 of wing 102 by human operator 116 or by a movement system depending on the particular implementation. Robotic device 118 is one example of a movement system that may move vacuum debulking tool 114. In other examples, vacuum debulking tool 114 may have wheels or may move along a track to move to a desired location on aircraft 106.

Figure 2:
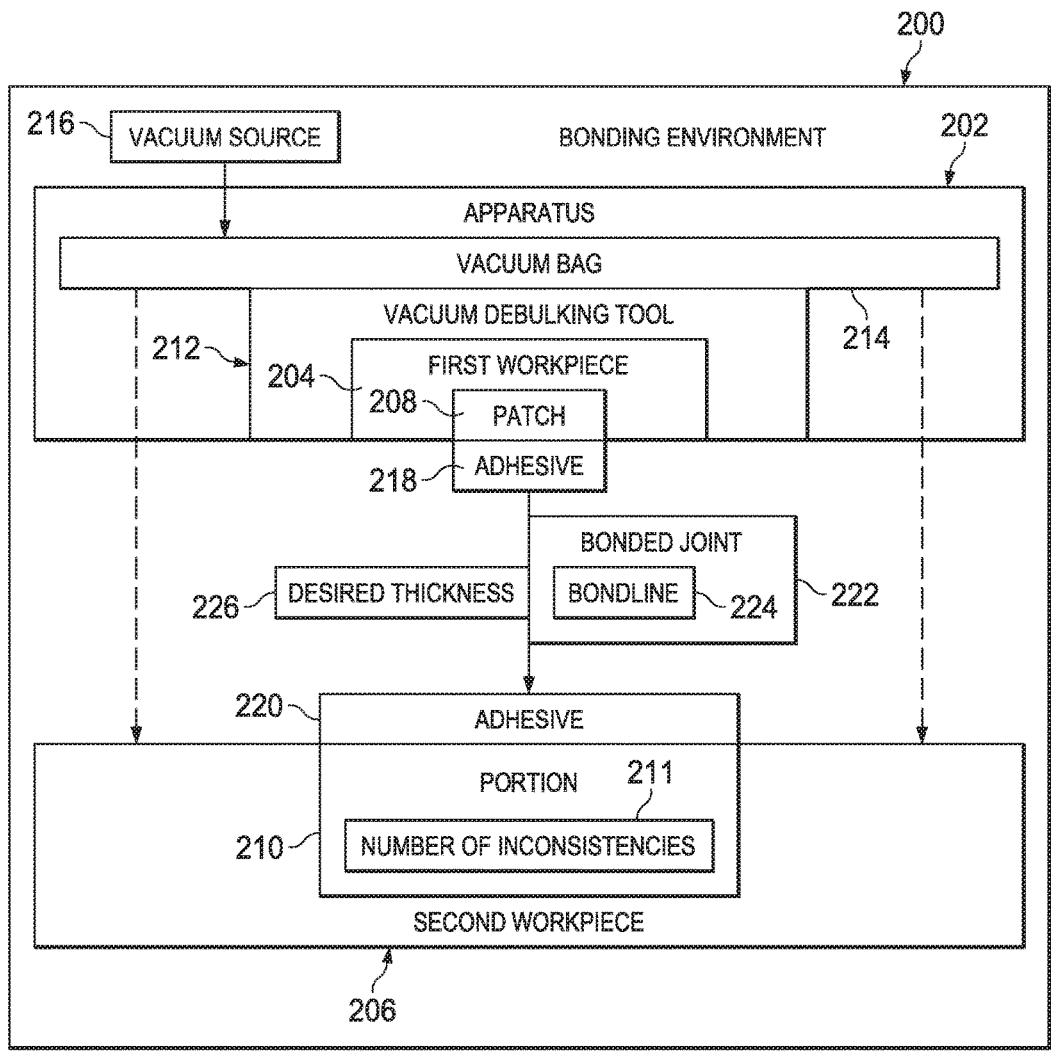
FIG. 2 is an illustration of a block diagram of a bonding environment in accordance with an illustrative embodiment.

With reference next to FIG. 2, an illustration of a block diagram of a bonding environment is depicted in accordance with an illustrative embodiment. As depicted, bonding environment 100 in FIG. 1 is one example of a physical implementation of bonding environment 200.

In this illustrative example, bonding environment 200 includes apparatus 202. Apparatus 104 in FIG. 1 is one example of a physical implementation for apparatus 202.

As illustrated, apparatus 202 may be configured to carry first workpiece 204. In other words, apparatus 202 may move first workpiece 204 from one location to another location. For example, apparatus 202 may position first workpiece 204 over second workpiece 206. In this case, apparatus 202 may be configured to rework second workpiece 206 using first workpiece 204.

In this example, first workpiece 204 may be formed from a number of different materials. For example, first workpiece 204 may be formed of one of a metal, a composite material, and some other suitable type of material.

The material selected for first workpiece 204 is selected depending on the material of second workpiece 206. As an example, when second workpiece 206 is comprised of metal, first workpiece 204 also may be comprised of metal. In a similar fashion, when second workpiece 206 is comprised of a composite material, first workpiece 204 also may be comprised of one or more composite materials.

In this illustrative example, first workpiece 204 takes the form of patch 208. Patch 208 may include a number of plies made of composite material. For instance, patch 208 may include carbon or boron fibers embedded in an epoxy resin. In other examples, other materials may be used for patch 208.

As depicted, patch 208 may have a number of different shapes. For example, patch 208 may have a circular shape, a rectangular shape, an oblong shape, a triangular shape, an irregular shape, or some other suitable shape. The shape of patch 208 may be selected to provide desirable mechanical properties to second workpiece 206 following rework. The shape of patch 208 may be configured to substantially conform to portion 210 of second workpiece 206. Portion 210 of second workpiece 206 may be a portion of second workpiece 206 that is to be reworked in this example. For example, portion 210 of second workpiece 206 may include number of inconsistencies 211.

Before patch 208 is used to rework second workpiece 206, the material in portion 210 of second workpiece 206 with the inconsistency is removed. The area in which composite material is removed from second workpiece 206 may be commonly referred to as a "scarf." In this process, the material may be removed in steps and replaced by patch 208.

As illustrated, apparatus 202 with first workpiece 204 is positioned over second workpiece 206. Second workpiece 206 may be comprised of a composite material, a metal, or some other suitable type of material. In this example, second workpiece 206 is comprised of a composite material.

In this depicted example, second workpiece 206 may be part of an aircraft. For instance, portion 210 of second workpiece 206 may be an example of portion 110 of surface 108 of wing 102 of aircraft 106 with number of inconsistencies 112 in FIG. 1. In other illustrative examples, second workpiece 206 may be another type of structure on which apparatus 202 may rework inconsistencies.

The surface of second workpiece 206 may have a variety of different shapes and contours. For example, second workpiece 206 may have a planar shape, an irregular shape, a curved shape, a stair-stepped shape, or some other suitable shape. Patch 208 may be configured to conform to the shape of second workpiece 206 in a desired manner.

As depicted, apparatus 202 may take the form of vacuum debulking tool 212. Vacuum debulking tool 212 is configured to position first workpiece 204 relative to second workpiece 206 and apply a vacuum to first workpiece 204 and portion 210 of second workpiece 206. Vacuum debulking tool 212 may apply the vacuum to draw air and other gases from patch 208 prior to compressing patch 208 onto second workpiece 206 to rework portion 210 of second workpiece 206. To apply this vacuum, vacuum debulking tool uses vacuum bag 214 and vacuum source 216.

In this depicted example, vacuum bag 214 covers vacuum debulking tool 212 and a portion of second workpiece 206. As an example, vacuum bag 214 is sealed to an upper surface of vacuum debulking tool 212. Vacuum bag 214 is also sealed to second workpiece 206. Vacuum bag 214 may comprise nylon and other suitable elements in this example. When vacuum debulking tool 212 is operated, vacuum source 216 may draw a vacuum on patch 208 and portion 210 of second workpiece 206 using vacuum bag 214.

As illustrated, vacuum bag 214 may be sealed to vacuum debulking tool 212 and second workpiece 206 using a sealing system. For example, vacuum bag 214 may be sealed to vacuum debulking tool 212 and second workpiece 206 using a tacky tape. In this instance, the sealing system may be applied to vacuum bag 214 around the perimeter of vacuum bag 214 and pressed against the surface of vacuum debulking tool 212 and the surface of second workpiece 206 such that air or other gases may not pass through the interface between vacuum bag 214 and vacuum debulking tool 212, and the interface between vacuum bag 214 and second workpiece 206.

In this depicted example, an adhesive may be applied to patch 208, portion 210 of second workpiece 206, or both. In particular, adhesive 218 may be applied to patch 208 and adhesive 220 may be applied to portion 210 of second workpiece 206.

Adhesive 218 and adhesive 220 may be the same or different types of adhesives in this example. For instance, adhesive 218 and adhesive 220 may be selected from at least one of a paste adhesive, a film adhesive, a resin system coupon, or other suitable types of adhesive.

In this illustrative example, adhesive 218 and adhesive 220 are an epoxy resin. In other illustrative examples, adhesive 218 and adhesive 220 may be comprised of other materials, depending on the particular implementation.

Materials used for adhesive 218 and adhesive 220 may have various viscosities. As viscosity of adhesive 218 and adhesive 220 increases, adhesive 218 and adhesive 220 may retain more entrapped air than less viscous adhesives. As a result, vacuum debulking tool 114 may need to remove more air and gases from adhesives as viscosity increases.

In this example, adhesive 218 and adhesive 220 form bonded joint 222 between patch 208 and portion 210 of second workpiece 206 when cured. In particular, adhesive 218 on patch 208 and adhesive 220 on portion 210 of second workpiece 206 may be cured to form bondline 224 in bonded joint 222.

As depicted, vacuum debulking tool 212 is configured to position patch 208 over second workpiece 206 such that the combination of adhesive 218 and adhesive 220 has desired thickness 226 when debulked and cured. In this example, desired thickness 226 may be referred to as a bondline thickness. Desired thickness 226 may be a thickness with desired properties for bonded joint 222. For instance, desired thickness may be a thickness that conforms to industry standards, manufacturer standards, stress analysis tests, or other suitable standards for properties of bonded joint 222.

Figure 3:
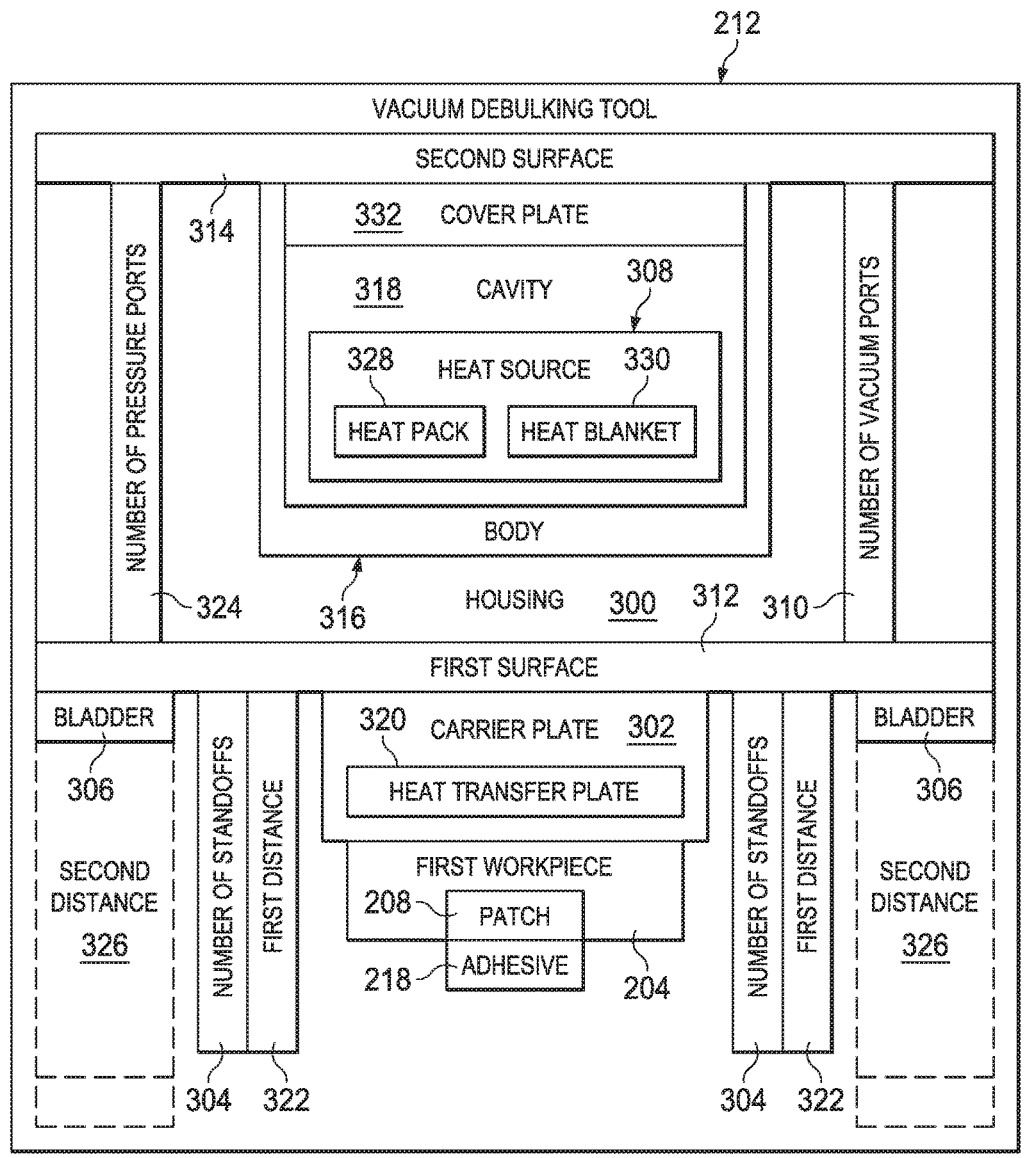
FIG. 3 is an illustration of a block diagram of a vacuum debulking tool in accordance with an illustrative embodiment.

With reference now to FIG. 3, an illustration of a block diagram of a vacuum debulking tool is depicted in accordance with an illustrative embodiment. Specifically, FIG. 3 depicts a detailed view of vacuum debulking tool 212 of FIG. 2. In this illustrative example, vacuum debulking tool 212 comprises a number of different components. For example, vacuum debulking tool 212 includes housing 300, carrier plate 302, number of standoffs 304, bladder 306, heat source 308, and number of vacuum ports 310.

As depicted, housing 300 has first surface 312, second surface 314, and body 316 arranged between first surface 312 and second surface 314. First surface 312 of housing 300 may be a lower surface that faces patch 208, while second surface 314 of housing 300 may be an upper surface that faces away from patch 208 in this illustrative example. In some illustrative examples, vacuum bag 214 of FIG. 2 may be sealed to second surface 314 of housing 300.

Housing 300 may comprise a number of different materials. For example, without limitation, housing 300 may be a metal, a metal alloy, a composite material, or some other suitable type of material. In some cases, housing 300 may be comprised of a material that is thermally non-conductive.

In this example, body 316 of housing 300 may have cavity 318. Cavity 318 is a hollow area within body 316 of housing 300. Cavity 318 may be configured to hold heat source 308 in this illustrative example.

As depicted, carrier plate 302 is associated with first surface 312 of housing 300. As used herein, when one component is "associated" with another component, the association is a physical association in the depicted examples. For example, a first component, such as carrier plate 302, may be considered to be associated with a second component, such as first surface 312 of housing 300, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component. In this example, carrier plate 302 may be attached to first surface 312 of housing 300 using a sealing system, a number of fasteners, a weld, or in some other suitable manner.

Carrier plate 302 may be comprised of various materials. For example, without limitation, carrier plate 302 may be comprised of a thermally conductive material, a metal, a metal alloy, or some other suitable type of material. When carrier plate 302 is a thermally conductive material, carrier plate 302 is configured to be heated to cure adhesive 218 and adhesive 220 (not shown). The cure temperature for adhesive 218 may range from about 25 degrees Celsius to about 350 degrees Celsius, depending on the properties of adhesive 218.

In one example, carrier plate 302 comprises heat transfer plate 320. Heat transfer plate 320 is configured to transfer heat from cavity 318 in housing 300 to patch 208 to form bonded joint 222 in FIG. 2. In this example, bonded joint 222 is formed when adhesive 218 and adhesive 220 are cured in a manner that bonds patch 208 to portion 210 of second workpiece 206 in FIG. 2. In this example, heat transfer plate 320 may extend beyond the largest part of patch 208 by several inches.

Carrier plate 302 may be configured to carry patch 208 in these illustrative examples. For example, patch 208 may be removably connected to carrier plate 302 such that vacuum debulking tool 212 may be removed from patch 208 after bonded joint 222 is formed between patch 208 and portion 210 of second workpiece 206.

In one example, patch 208 may be removably connected to carrier plate 302 using tacky tape. In other examples, patch 208 may be removably connected to carrier plate 302 using another type of sealing system. In yet other examples, patch 208 may be removably connected to carrier plate 302 using a vacuum.

In this illustrative example, number of standoffs 304 also may be physically associated with first surface 312 of housing 300. Number of standoffs 304 may be configured to maintain a minimum desired distance between first surface 312 of housing 300 and second workpiece 206 of FIG. 2. In particular, number of standoffs 304 may be arranged along first surface 312 of housing 300 about carrier plate 302. For instance, if carrier plate 302 is circular, number of standoffs 304 may be arranged about the perimeter of the circle.

Materials for number of standoffs 304 may include a metal, a composite material, or some other suitable type of material. In some cases, number of standoffs 304 may be coated with a polytetraflouroethylene material in order to limit harm to second workpiece 206 from contact with number of standoffs 304.

Number of standoffs 304 may be configured to extend first distance 322 outwardly from first surface 312 of housing 300. Number of standoffs 304 may be adjustable in this example. Accordingly, first distance 322 of number of standoffs 304 may be adjusted relative to first surface 312 of housing 300. In one example, number of standoffs 304 may be adjustable by changing first distance 322 by extending or retracting number of standoffs 304. Number of standoffs 304 may be extended or retracted through threads or other means to threadably accommodate patches of different sizes. In some examples, number of standoffs 304 may be adjustable by being configured to be detached from first surface 312 of housing 300. In these examples, number of standoffs 304 may be detached and replaced to increase or decrease first distance 322. In other examples, number of standoffs 304 may be adjusted in some other suitable manner.

In this illustrative example, bladder 306 is physically associated with first surface 312 of housing 300. In one example, bladder 306 may be attached to first surface 312 of housing 300 using a number of fasteners. In other examples, bladder 306 may be attached to first surface 312 of housing 300 using a sealing system or in some other suitable manner.

As illustrated, bladder 306 may be positioned around carrier plate 302. For example, bladder 306 may surround carrier plate 302 on all sides. In other illustrative examples, bladder 306 may extend around carrier plate 302 on one or more sides. In yet another example, more than one bladder 306 may be used. In this instance, each bladder 306 may not be physically associated with one another and may be operated using a separate inflation and deflation mechanism, depending on the particular implementation.

In this example, bladder 306 is configured to position housing 300 relative to second workpiece 206. Bladder 306 may be inflated and deflated to position housing 300 relative to second workpiece 206. Bladder 306 may be inflated using pressurized air received by a hose (not shown) through number of pressure ports 324.

In this illustrative example, bladder 306 is configured to extend second distance 326 from first surface 312 of housing 300, which is shorter than first distance 322 of number of standoffs 304 when bladder 306 is in a deflated state. Bladder 306 is further configured to extend second distance 326 from first surface 312 of housing 300, which is a greater distance from second surface 314 than first distance 322 of number of standoffs 304 when bladder 306 is in an inflated state. In this manner, bladder 306 may be inflated and deflated to move housing 300 closer to or farther away from second workpiece 206.

As depicted, heat source 308 may be positioned within cavity 318 of housing 300. Heat source 308 is configured to provide heat to adhesive 218 and adhesive 220 between patch 208 and portion 210 of second workpiece 206. In particular, heat source 308 heats heat transfer plate 320 to cure adhesive 218 and adhesive 220 to form bonded joint 222. Heat source 308 may be heated to a range of about 25 degrees Celsius to 350 degrees Celsius, depending on the properties of adhesive 218 and adhesive 220 and the thermal conductivity of heat transfer plate 320.

Heat source 308 may maintain a level of heat for heat transfer plate 320 in a desired range for a specified duration. In this illustrative example, the desired range and the specified duration are selected depending on the properties of adhesive 218 and adhesive 220.

Heat source 308 may take a number of different forms. For example, heat source 308 may take the form of heat pack 328, heat blanket 330, or some other suitable type of heat source.

In this illustrative example, heat source 308 may be positioned in cavity 318 of housing 300 using cover plate 332. Cover plate 332 is configured to cover cavity 318 and lie flush with body 316 of housing 300. In this example, housing 300 may be opened using cover plate 332 to expose cavity 318. Heat source 308 may then be placed inside cavity 318.

As illustrated, number of vacuum ports 310 may be arranged within housing 300. In this example, number of vacuum ports 310 extends from first surface 312 of housing 300 to second surface 314 of housing 300. Number of vacuum ports 310 may be configured to be attached to vacuum source 216 in FIG. 2. Number of vacuum ports 310 may be used to draw a vacuum on patch 208 and portion 210 of second workpiece 206.

As depicted, number of pressure ports 324 also may be arranged within housing 300. Number of pressure ports 324 may extend from first surface 312 of housing 300 to second surface 314 of housing 300. Number of pressure ports 324 may be configured to receive pressurized air from a hose or to release pressure within bladder 306. In other words, number of pressure ports 324 may inflate or deflate bladder 306.

The illustrations of bonding environment 200 in FIG. 2 and vacuum debulking tool 212 in FIG. 2 and FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although the illustrative examples are described with respect to aircraft 106, an illustrative embodiment may be applied to other types of platforms. For example, without limitation, second workpiece 206 may be implemented on a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

Further, although patch 208 in FIG. 2 and FIG. 3 has been described with reference to a number of plies of composite material in this example, patch 208 also may be comprised of metal. For example, when reworking a metal structure in a platform, patch 208 may comprise a metal stack-up that may be pressure sintered or otherwise secured to the platform in a desired manner.

Figure 4:
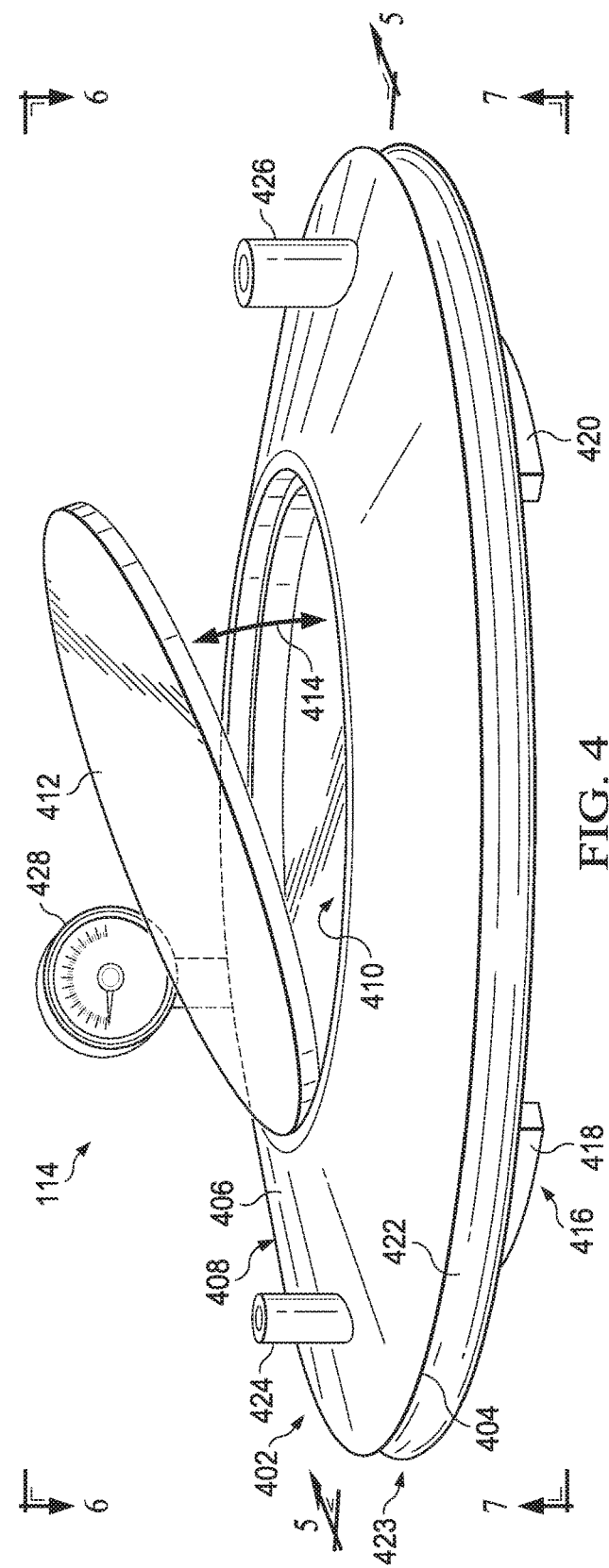
FIG. 4 is an illustration of an isometric view of a vacuum debulking tool in accordance with an illustrative embodiment.

Turning now to FIG. 4, an illustration of an isometric view of a vacuum debulking tool is depicted in accordance with an illustrative embodiment. In this depicted example, vacuum debulking tool 114 from FIG. 1 is shown. Vacuum debulking tool 114 may be a physical implementation of vacuum debulking tool 212 of FIG. 2 and FIG. 3.

As illustrated, vacuum debulking tool 114 comprises housing 402 with first surface 404, second surface 406, and body 408 arranged between first surface 404 and second surface 406. Cavity 410 is arranged within body 408 of housing 402.

In this illustrative example, cover plate 412 is part of housing 402. Cover plate 412 may have an open position and a closed position. In this illustrative example, cover plate 412 may be moved in the direction of arrow 414 to place cover plate 412 in an open position or a closed position.

Cover plate 412 may move relative to second surface 406 of housing 402 in a variety of different ways. In one example, cover plate 412 may have a hinge along one side of cover plate 412 that assists in movement along arrow 414. In other examples, cover plate 412 may be completely removed from housing 402 in order to expose cavity 410 in housing 402.

When cover plate 412 is moved into an open position, a heat source (not shown) may be positioned within cavity 410. When cover plate 412 is moved into a closed position, the upper surface of cover plate 412 may lie substantially flush with second surface 406 of housing 300 in these examples.

As illustrated, bladder 422 is physically associated with first surface 404 of housing 402. In this example, bladder 422 is in deflated state 423. When bladder 422 is in deflated state 423, number of standoffs 416 extends outwardly from first surface 404 of housing 402 below bladder 422. In other words, number of standoffs 416 extends further from first surface 404 of housing 402 than bladder 422. In this view, standoff 418 and standoff 420 in number of standoffs 416 are shown.

Pressure port 424 is shown connected to second surface 406 of housing 402. Pressure port 424 also extends through housing 402 to bladder 422. Pressure port 424 may be used to inflate or deflate bladder 422 as desired. Bladder 422 is inflated by pressurized air received via a hose (not shown) connected to pressure port 424 in housing 402. Bladder 422 also may be deflated using pressure port 424.

As depicted, vacuum port 426 extends from second surface 406 of housing 402. Vacuum port 426 also may extend through housing 402. In this illustrative example, vacuum port 426 is connected to a vacuum source with a hose (not shown). Vacuum gauge 428 measures the vacuum pressure in this illustrative example.

Figure 5:
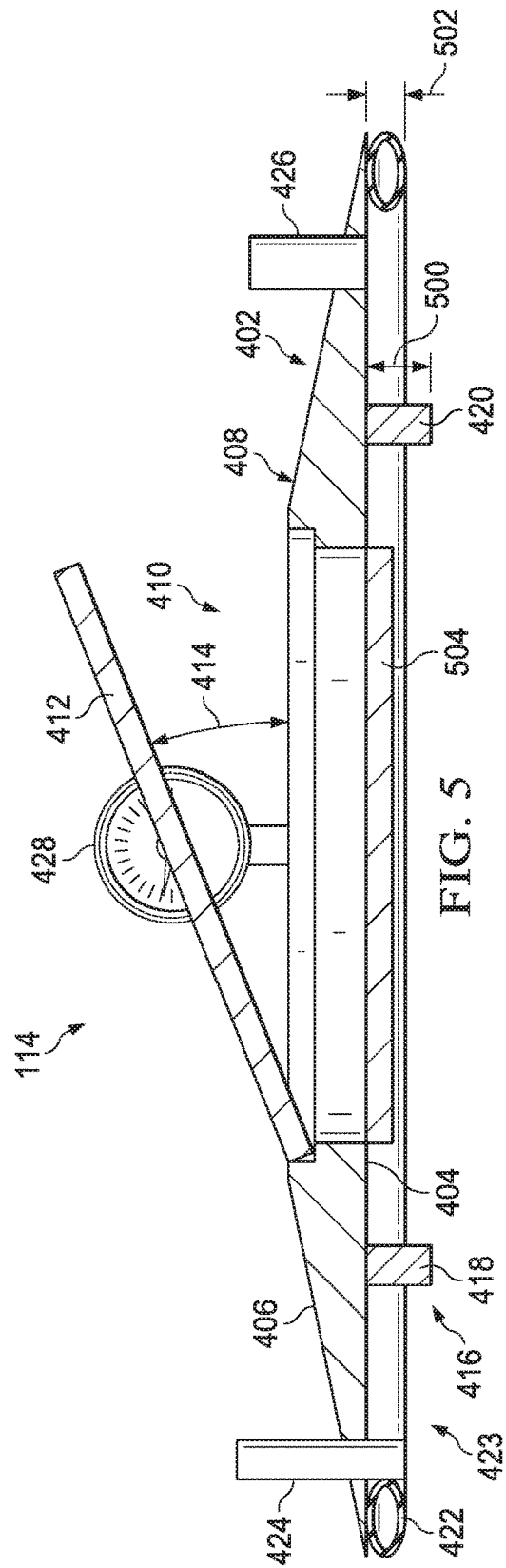
FIG. 5 is an illustration of a cross-sectional view of a vacuum debulking tool in accordance with an illustrative embodiment.

In FIG. 5, an illustration of a cross-sectional view of a vacuum debulking tool is depicted in accordance with an illustrative embodiment. In this example, a cross-sectional view of vacuum debulking tool 114 is shown along lines 5-5 in FIG. 4.

As depicted, standoff 418 and standoff 420 extend first distance 500 outwardly from first surface 404 of housing 402. In some cases, standoff 418 and standoff 420 may be adjustable.

In this depicted example, each of number of standoffs 416 extends the same distance from first surface 404 of housing 402. In other examples, one or more of number of standoffs 416 may extend outwardly from first surface 404 of housing 402 at different distances from one or more other of number of standoffs 416. For example, without limitation, when the surface of second workpiece 206 in FIG. 2 has an irregular shape, standoff 420 may extend a greater distance than standoff 418.

As illustrated, first distance 500 for number of standoffs 416 is selected such that the joint between workpieces has a desired thickness once cured. As an example, first distance 500 of standoff 418 and standoff 420 may be selected such that a desired thickness for bonded joint 222 in FIG. 2 occurs.

In deflated state 423, bladder 422 extends second distance 502 from first surface 404 of housing 402. Second distance 502 is shorter than first distance 500 in this depicted example. In other examples, pressurized air may inflate bladder 422 such that second distance 502 may be greater than or equal to first distance 500. In this case, bladder 422 extends further from first surface 404 of housing 402 than number of standoffs 416.

As depicted, carrier plate 504 is physically associated with first surface 404 of housing 402. Carrier plate 504 may be configured to carry a patch to rework second workpiece 206 in this illustrative example.

Figure 6:
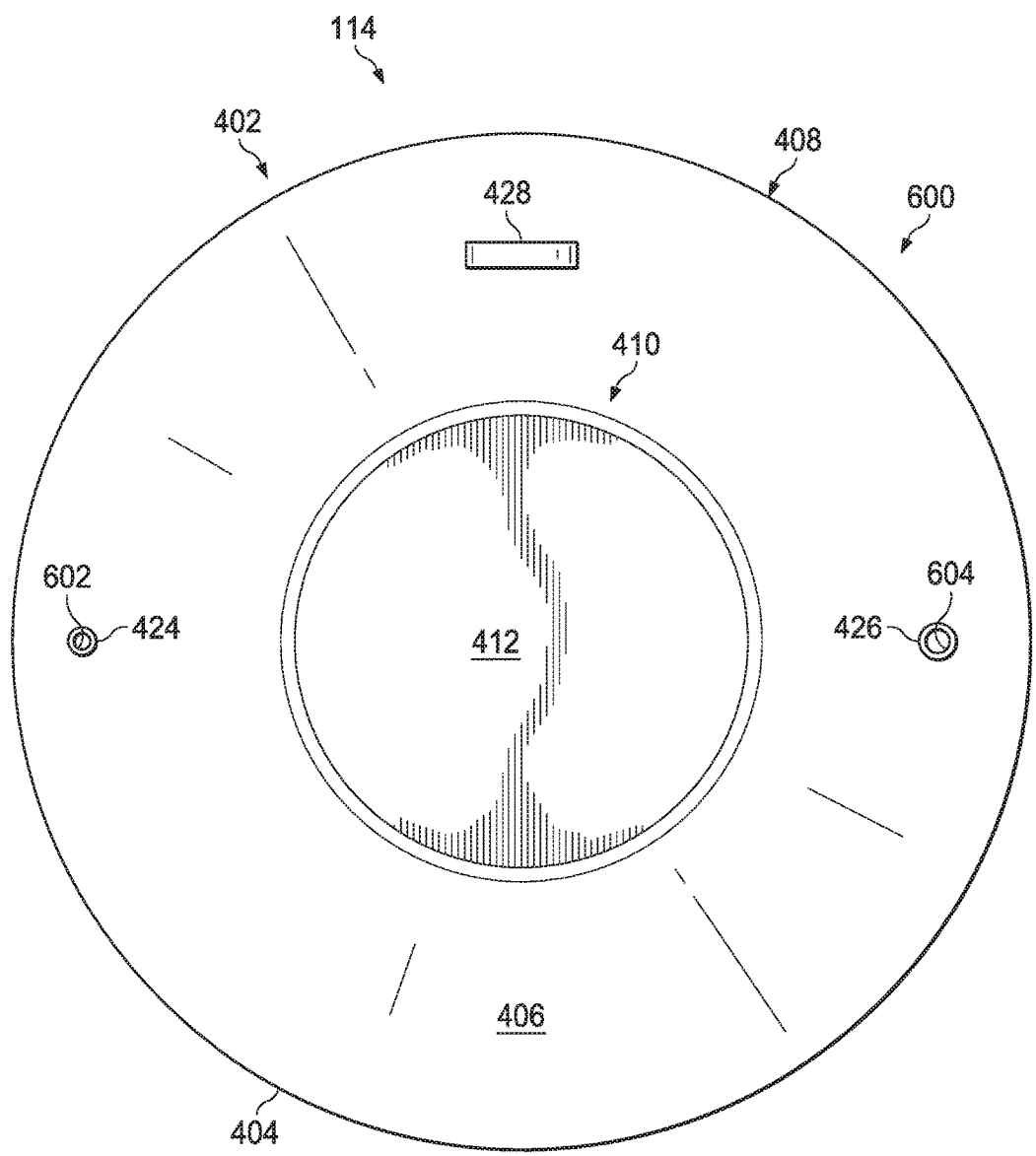
FIG. 6 is an illustration of a top view of a vacuum debulking tool in accordance with an illustrative embodiment.

Referring next to FIG. 6, an illustration of a top view of a vacuum debulking tool is depicted in accordance with an illustrative embodiment. In this example, a top view of vacuum debulking tool 114 in the direction of lines 6-6 in FIG. 4 is shown.

As depicted, housing 402 of vacuum debulking tool 114 has circular shape 600. Circular shape 600 is only one example of a shape for housing 402 of vacuum debulking tool 114. In other examples, housing 402 of vacuum debulking tool 114 may have a rectangular shape, a triangular shape, a hexagonal shape, an octagonal shape, or some other suitable type of shape.

In this illustrative example, pressure port 424 has opening 602. Opening 602 may be an opening through which air is released when deflating bladder 422 in FIG. 4. Opening 602 also may receive pressurized air from a hose to inflate bladder 422 with pressurized air in this example. When bladder 422 is in deflated state 423, bladder 422 may not extend past the edges of housing 402 in this example.

Vacuum port 426 includes opening 604. As illustrated, opening 604 may be connected to a hose. A vacuum source draws a vacuum through opening 604 in vacuum port 426 when a vacuum bag (not shown) is present in this example. The vacuum source may draw a vacuum to provide a desired level of pressure for debulking or curing adhesive to form a bonded joint.

Although vacuum debulking tool 114 shown in this illustration includes one pressure port 424 and one vacuum port 426, in other illustrative examples, more than one pressure port 424, vacuum port 426, or both may be present in vacuum debulking tool 114. In still other illustrative examples, vacuum debulking tool 114 may be configured without vacuum port 426. In this instance, a vacuum probe may be placed in vacuum bag 214 to apply the vacuum to debulk and cure the adhesive to form the bonded joint.

Figure 7:
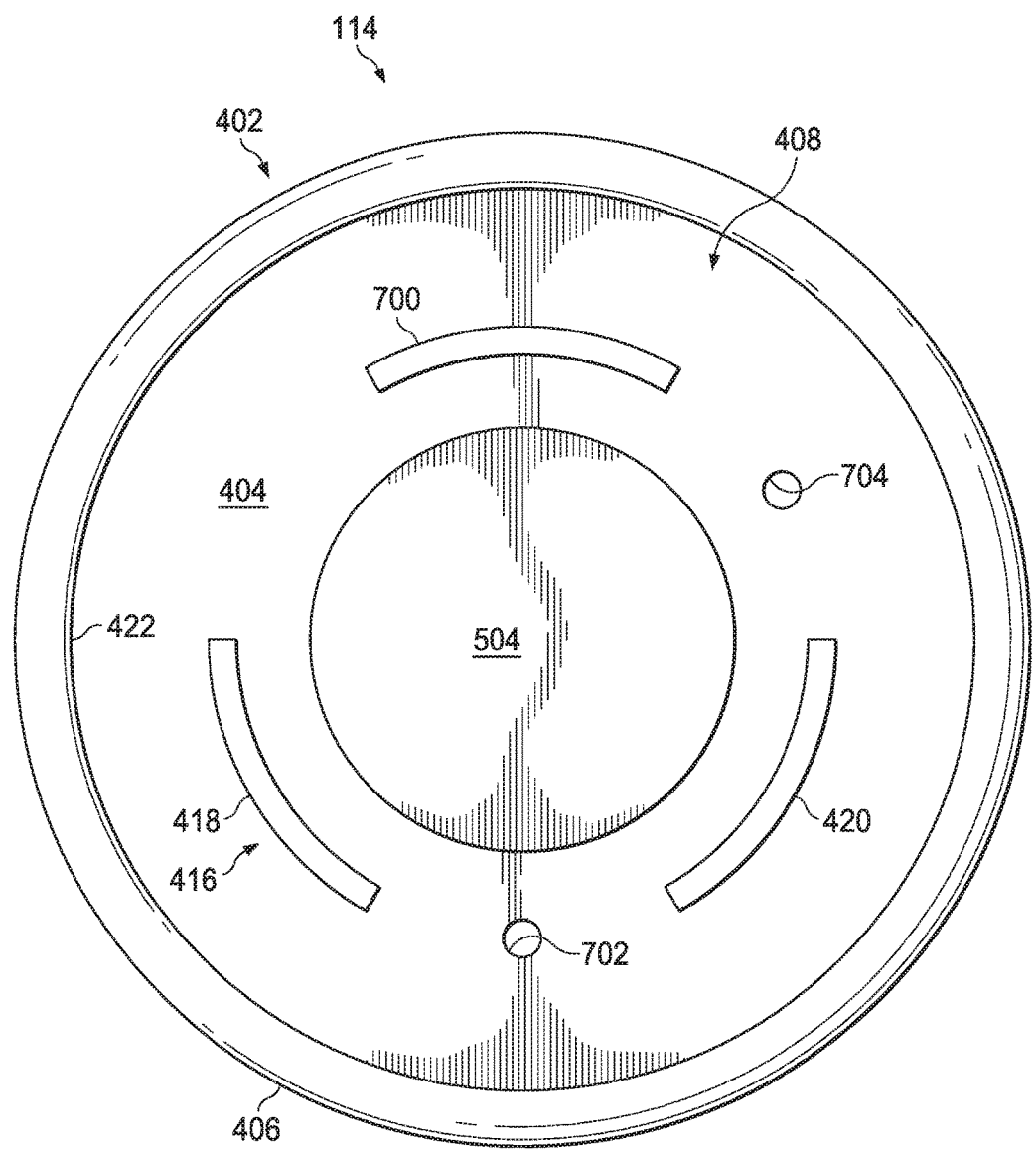
FIG. 7 is an illustration of a bottom view of a vacuum debulking tool in accordance with an illustrative embodiment.

In FIG. 7, an illustration of a bottom view of a vacuum debulking tool is depicted in accordance with an illustrative embodiment. In this example, a bottom view of vacuum debulking tool 114 in the direction of lines 7-7 in FIG. 4 is shown.

As illustrated, a portion of first surface 404 of housing 402 is exposed. Number of standoffs 416 is arranged along first surface 404 of housing 402. In this example, standoff 700 also may be seen. Although three standoffs are shown in this example, any number of standoffs in number of standoffs 416 may be used. For example, one standoff, two standoffs, five standoffs, twelve standoffs, or some other suitable number of standoffs may be arranged along first surface 404 of housing 402. In some embodiments, number of standoffs 416 may comprise one continuous standoff that surrounds carrier plate 504.

In this depicted example, carrier plate 504 has opening 702 and opening 704. Opening 702 corresponds to vacuum gauge 428, while opening 704 corresponds to vacuum port 426 in FIG. 6.

Figure 8:
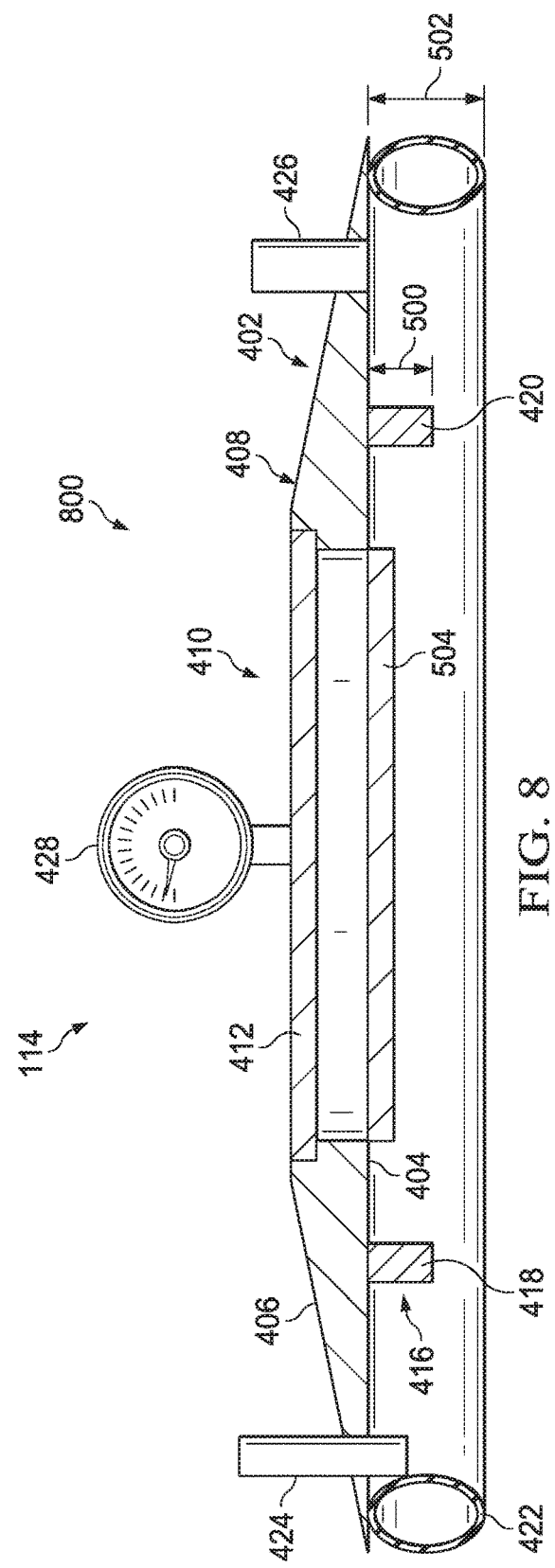
FIG. 8 is an illustration of a cross-sectional view of a vacuum debulking tool in accordance with an illustrative embodiment.

Turning next to FIG. 8, an illustration of a cross-sectional view of a vacuum debulking tool is depicted in accordance with an illustrative embodiment. In this example, the cross-sectional view of vacuum debulking tool 114 from FIG. 5, taken along lines 5-5 in FIG. 4 is shown with bladder 422 in inflated state 800. As illustrated, bladder 422 is inflated such that second distance 502 is greater than first distance 500.

Figure 9:
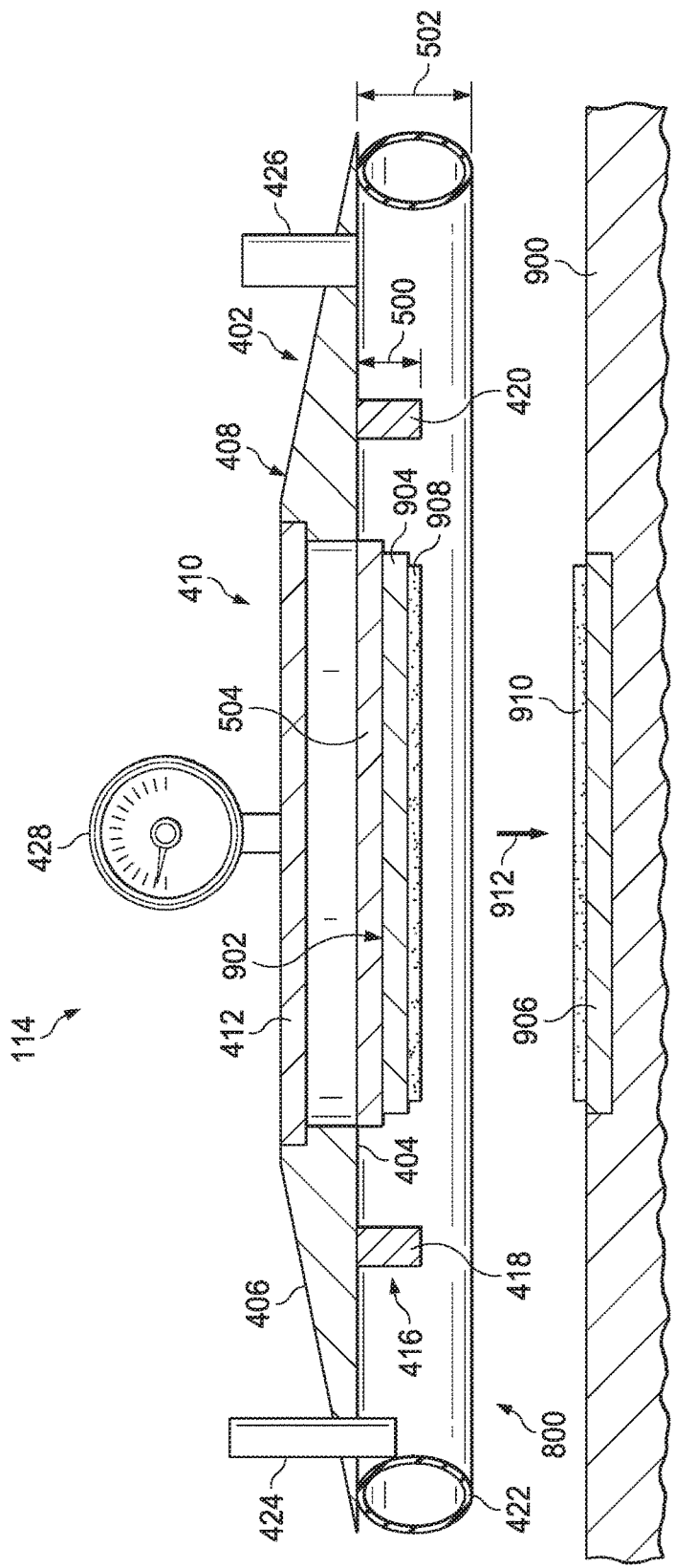
FIG. 9 is an illustration of a cross-sectional view of a vacuum debulking tool in accordance with an illustrative embodiment.
Figure 10:
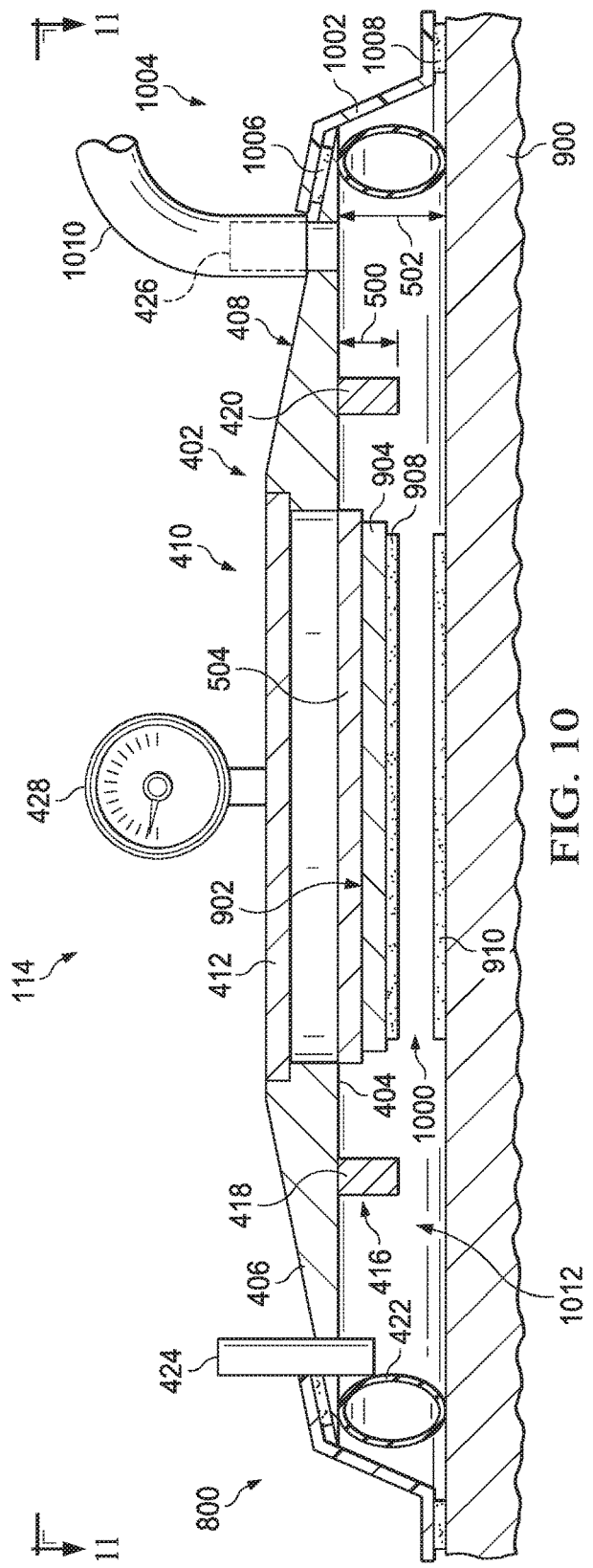
FIG. 10 is an illustration of a cross-sectional view of a vacuum debulking tool in accordance with an illustrative embodiment.
Figure 11:
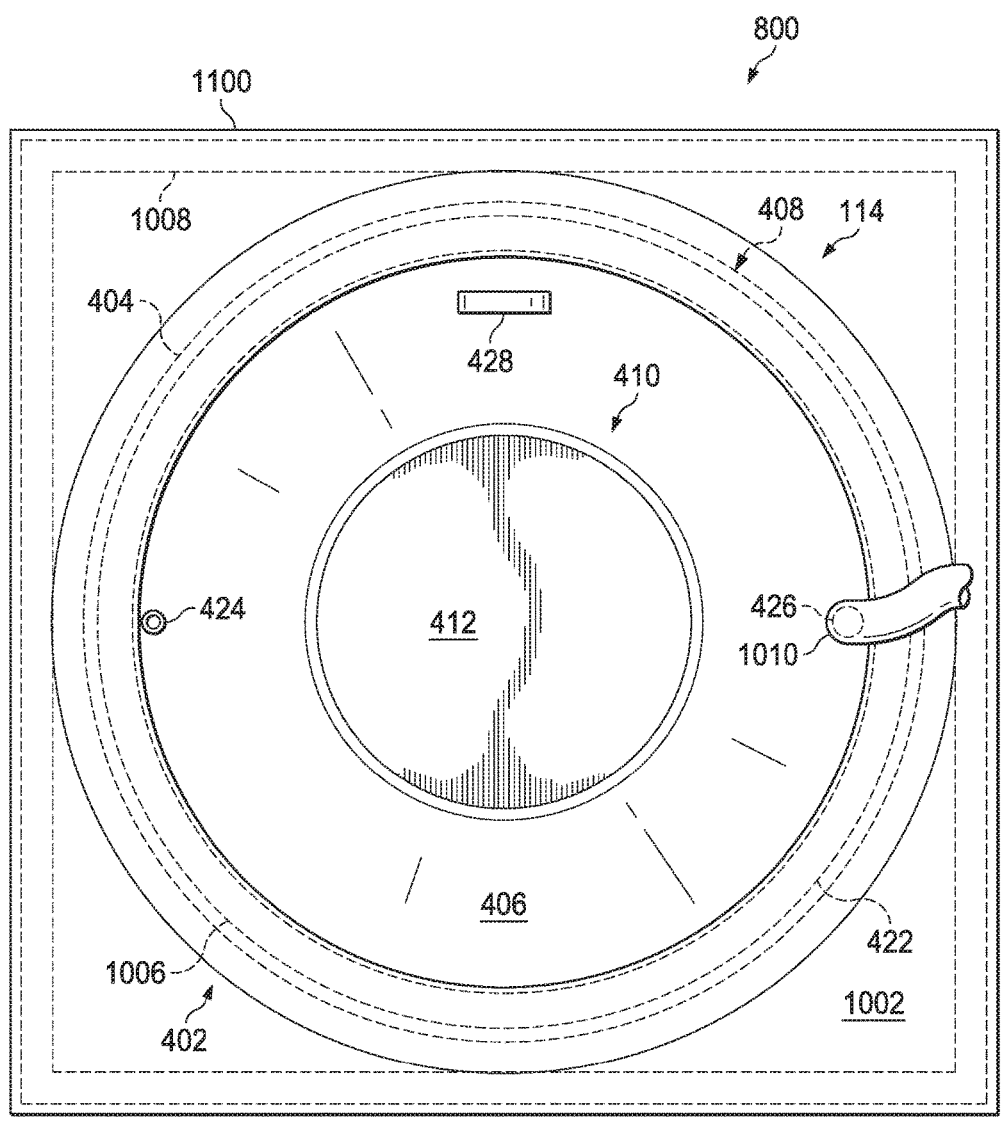
FIG. 11 is an illustration of a top view of a vacuum debulking tool in accordance with an illustrative embodiment.
Figure 12:
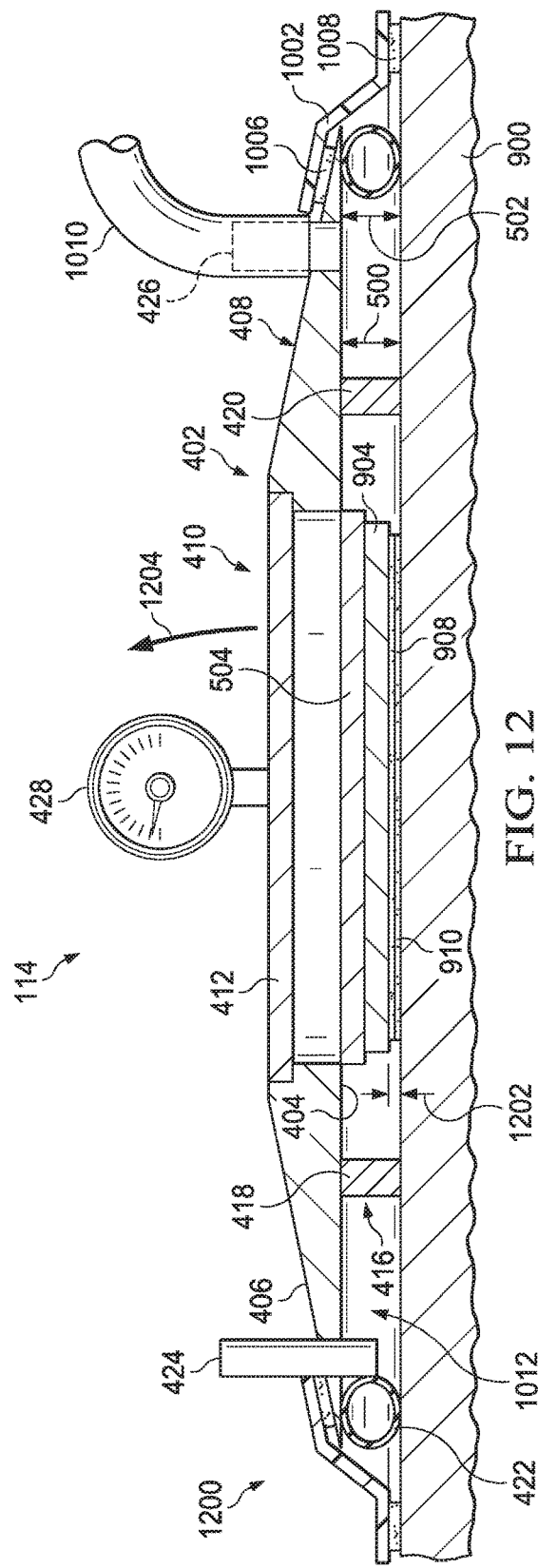
FIG. 12 is an illustration of a cross-sectional view of a vacuum debulking tool in accordance with an illustrative embodiment.
Figure 13:
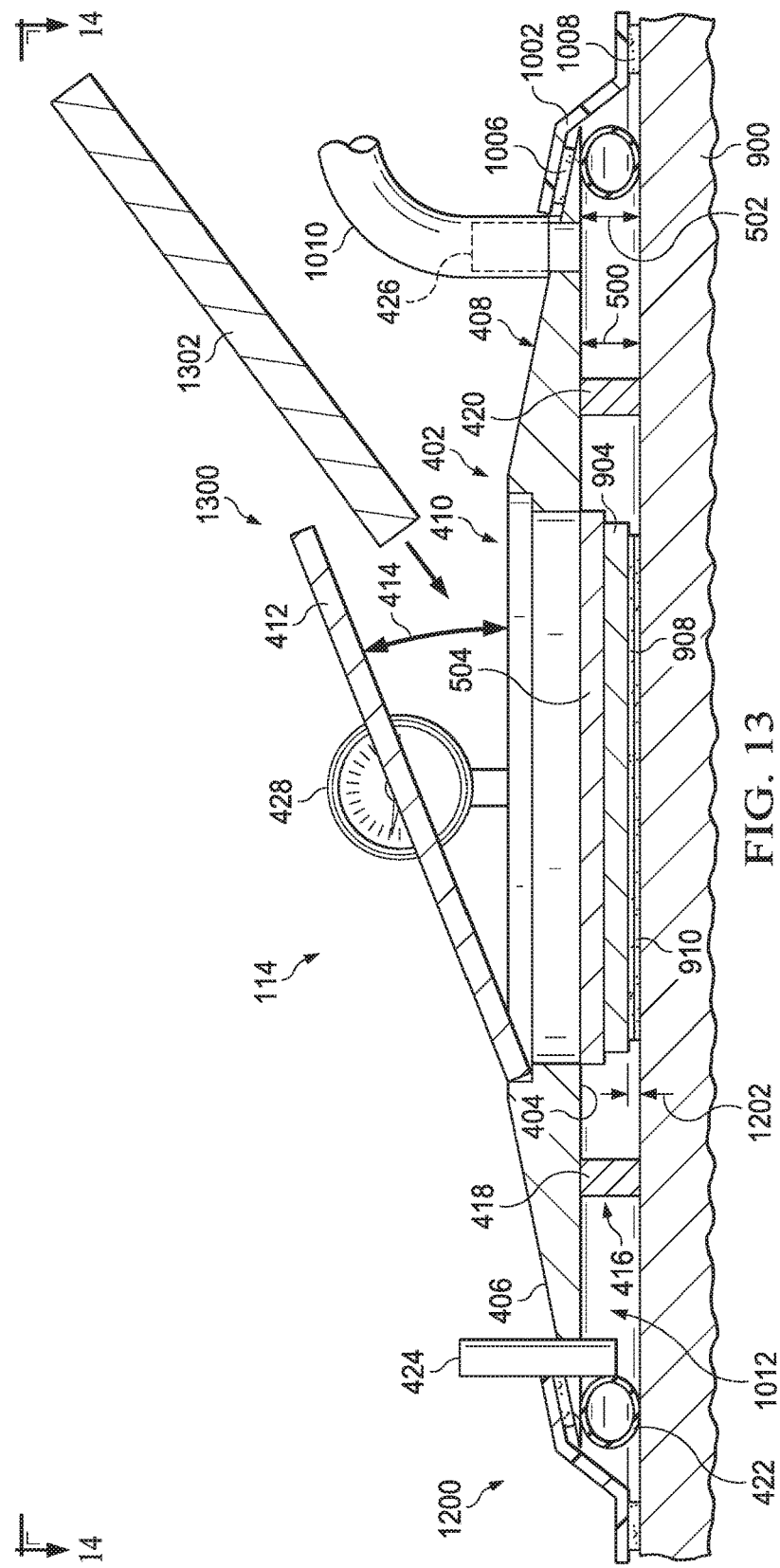
FIG. 13 is an illustration of a cross-sectional view of a vacuum debulking tool with a cover plate in an open position in accordance with an illustrative embodiment.
Figure 14:
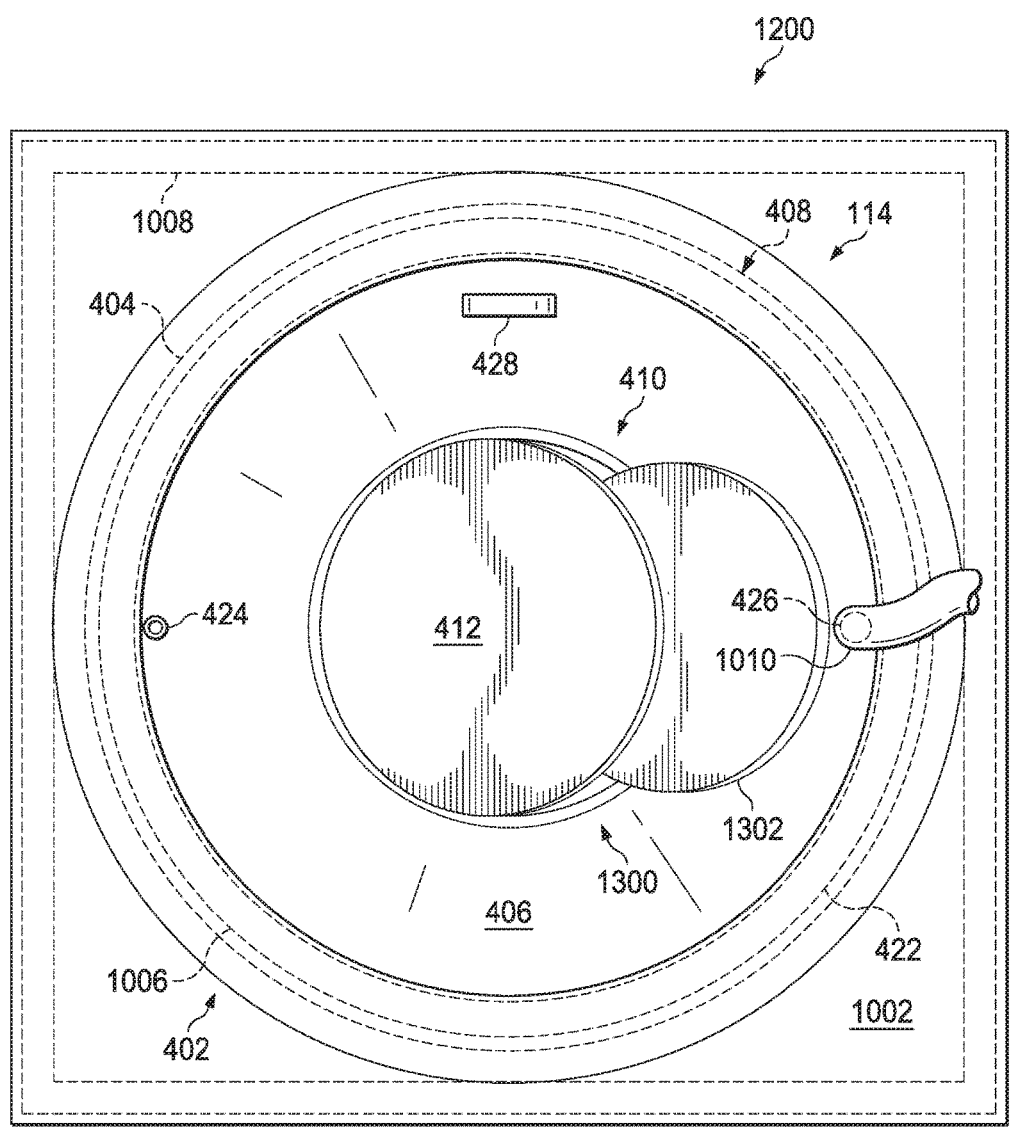
FIG. 14 is an illustration of a top view of a vacuum debulking tool with a cover plate in an open position in accordance with an illustrative embodiment.

FIGS. 9-16 depict a vacuum debulking tool relative to a second workpiece. Specifically, FIGS. 9-16 depict a vacuum debulking tool relative to a second workpiece during various steps of a rework. FIGS. 9-10, 12-13, and 15-16 depict vacuum debulking tool 114 along lines 5-5 of FIG. 4 relative to second workpiece 900. FIG. 11 and FIG. 14 depict vacuum debulking tool 114 from direction 6-6 of FIG. 4 relative to second workpiece 900.

In FIG. 9, an illustration of a cross-sectional view of a vacuum debulking tool is depicted in accordance with an illustrative embodiment. In this view, vacuum debulking tool 114 has been placed over second workpiece 900. In this illustrative example, second workpiece 900 may be one example of wing 102 in FIG. 1.

As depicted, first workpiece 902 has been removably attached to carrier plate 504. First workpiece 902 is patch 904 in this example. Patch 904 may be used to rework portion 906 of second workpiece 900 that has one or more inconsistencies.

In this illustrative example, adhesive 908 is applied to patch 904. In a similar fashion, adhesive 910 is applied to portion 906 of second workpiece 900.

After adhesive 908 and adhesive 910 have been applied to patch 904 and portion 906 of second workpiece 900, respectively, vacuum debulking tool 114 is moved in the direction of arrow 912 such that the bottom surface of bladder 422 is substantially flush with the upper surface of second workpiece 900.

Referring next to FIG. 10, an illustration of a cross-sectional view of a vacuum debulking tool is depicted in accordance with an illustrative embodiment. In this example, vacuum debulking tool 114 has been moved in the direction of arrow 912 in FIG. 9 such that the bottom surface of bladder 422 is substantially flush with the upper surface of second workpiece 900. In other words, vacuum debulking tool 114 is moved towards second workpiece 900 such that vacuum debulking tool 114 is positioned relative to second workpiece 900. Further, carrier plate 504 is positioned relative to second workpiece 900. Gap 1000 is present between adhesive 908 and adhesive 910 when bladder 422 is in inflated state 800.

As illustrated, vacuum bag 1002 is positioned over second surface 406 of housing 402 and a portion of second workpiece 900. Vacuum bag 1002 is sealed using sealing system 1004 in this example. Sealing system 1004 includes tacky tape 1006 and tacky tape 1008.

In this depicted example, tacky tape 1006 is arranged along second surface 406 of housing 402 in a manner such that cover plate 412 may move between an open position and a closed position. In other words, tacky tape 1006 is arranged around cover plate 412 such that tacky tape 1006 may not interfere with movement of cover plate 412.

In a similar fashion, tacky tape 1008 is arranged along the perimeter of vacuum bag 1002 and attached to second workpiece 900. Tacky tape 1008 forms an interface between vacuum bag 1002 and second workpiece 900. Tacky tape 1006 forms an interface between vacuum bag 1002 and second surface 406 of housing 402. Tacky tape 1006 and tacky tape 1008 substantially prevent air and other gasses from passing through the interface between vacuum bag 1002 and second surface 406 of housing 402 and second workpiece 900, respectively.

As depicted, vacuum port 426 is connected to hose 1010, which in turn, is connected to a vacuum source (not shown). A vacuum may then be drawn on chamber 1012 formed by vacuum bag 1002, housing 402, and second workpiece 900. The vacuum may remove air and other gases from adhesive 908, adhesive 910, or both. In this manner, vacuum debulking tool 114 may be used to reduce inconsistencies formed in a resultant bond joint from adhesive 908 and adhesive 910.

Turning now to FIG. 11, an illustration of a top view of a vacuum debulking tool is depicted in accordance with an illustrative embodiment. In this example, a top view of vacuum debulking tool 114 in the direction of lines 11-11 in FIG. 10 is shown. In this depicted example, vacuum bag 1002 is transparent.

As illustrated, perimeter 1100 of vacuum bag 1002 has a square shape. Tacky tape 1008 lines perimeter 1100 of vacuum bag 1002 to attach vacuum bag 1002 to second workpiece 900 (not shown in this view). Tacky tape 1006 is arranged in a circular fashion around cover plate 412. In other illustrative examples, vacuum bag 1002 may cover substantially all of vacuum debulking tool 114. In this case, the heat source already may be placed in vacuum debulking tool 114 prior to applying the vacuum.

In FIG. 12, an illustration of a cross-sectional view of a vacuum debulking tool is depicted in accordance with an illustrative embodiment. In this example, the cross-sectional view of bladder 422 of vacuum debulking tool 114 shown previously in FIG. 10 has been deflated.

As illustrated, first distance 500 is greater than second distance 502 when bladder 422 is in deflated state 1200. The bottom portion of number of standoffs 416 is substantially flush with the upper surface of second workpiece 900 such that desired thickness 1202 of adhesive 908 and adhesive 910 is provided. Adhesive 908 and adhesive 910 are now ready to be cured.

To begin curing adhesive 908 and adhesive 910, a heat source may be added to vacuum debulking tool 114. In this case, cover plate 412 is moved in the direction of arrow 1204 to expose cavity 410 of housing 402.

Referring now to FIG. 13, an illustration of a cross-sectional view of a vacuum debulking tool with a cover plate in an open position is depicted in accordance with an illustrative embodiment. The cross-sectional view of vacuum debulking tool 114 in FIG. 12 is shown with cover plate 412 moved in the direction of arrow 414. In particular, cover plate 412 of housing 402 of vacuum debulking tool 114 has been moved to open position 1300 to expose cavity 410 in housing 402.

As illustrated, heat source 1302 may be placed in cavity 410 of housing 402. Heat source 1302 may be a heat pack, a heat blanket, a thermocouple device, or some other suitable type of heat source. In some examples, heat source 1302 may be activated wirelessly to begin heating cavity 410 of housing 402, or may be activated in some other manner. Heat source 1302 may then be used to cure adhesive 908 and adhesive 910 as desired.

Turning now to FIG. 14, an illustration of a top view of a vacuum debulking tool with a cover plate in an open position is depicted in accordance with an illustrative embodiment. In this example, a top view of vacuum debulking tool 114 in the direction of lines 14-14 in FIG. 13 is shown. In this example, cover plate 412 is shown in open position 1300 with heat source 1302 arranged inside cavity 410 of housing 402 of vacuum debulking tool 114.

Figure 15:
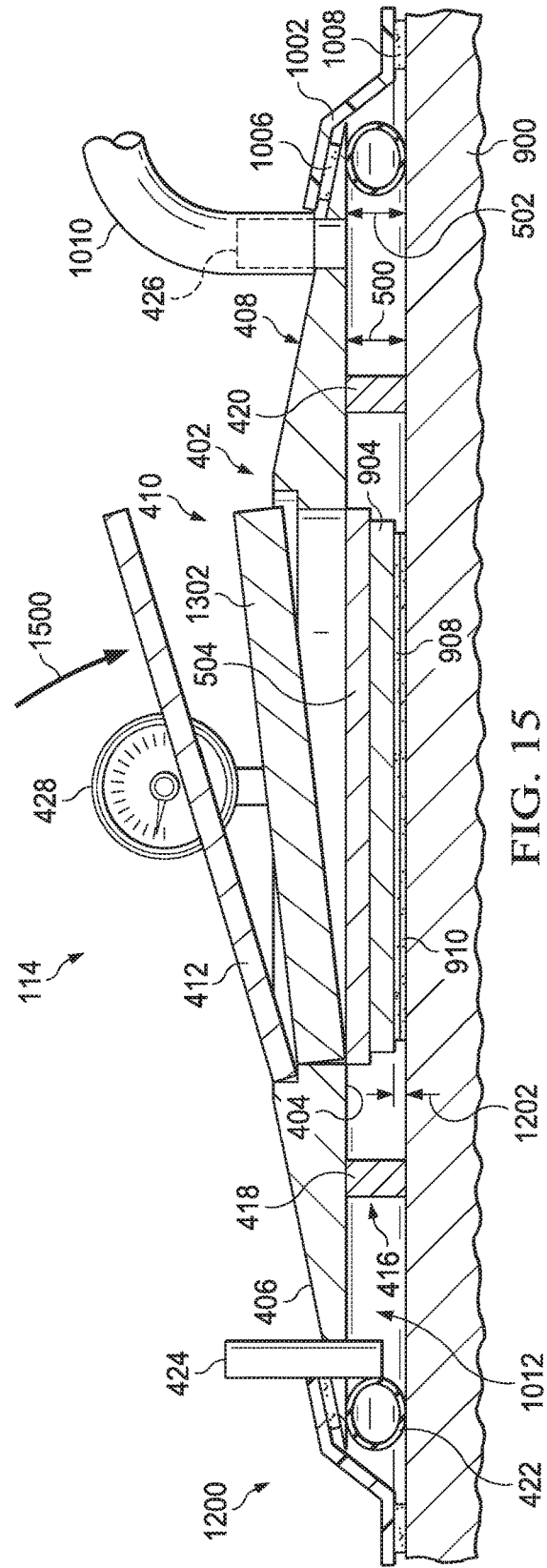
FIG. 15 is an illustration of a cross-sectional view of a vacuum debulking tool with a heat source in accordance with an illustrative embodiment.

In FIG. 15, an illustration of a cross-sectional view of a vacuum debulking tool with a heat source is depicted in accordance with an illustrative embodiment. The cross-sectional of vacuum debulking tool 114 shown in FIG. 13 is depicted with heat source 1302. As depicted, heat source 1302 has been placed in cavity 410 of housing 402 of vacuum debulking tool 114. Cover plate 412 may then be moved in the direction of arrow 1500 to close housing 402 such that cavity 410 is no longer exposed.

Figure 16:
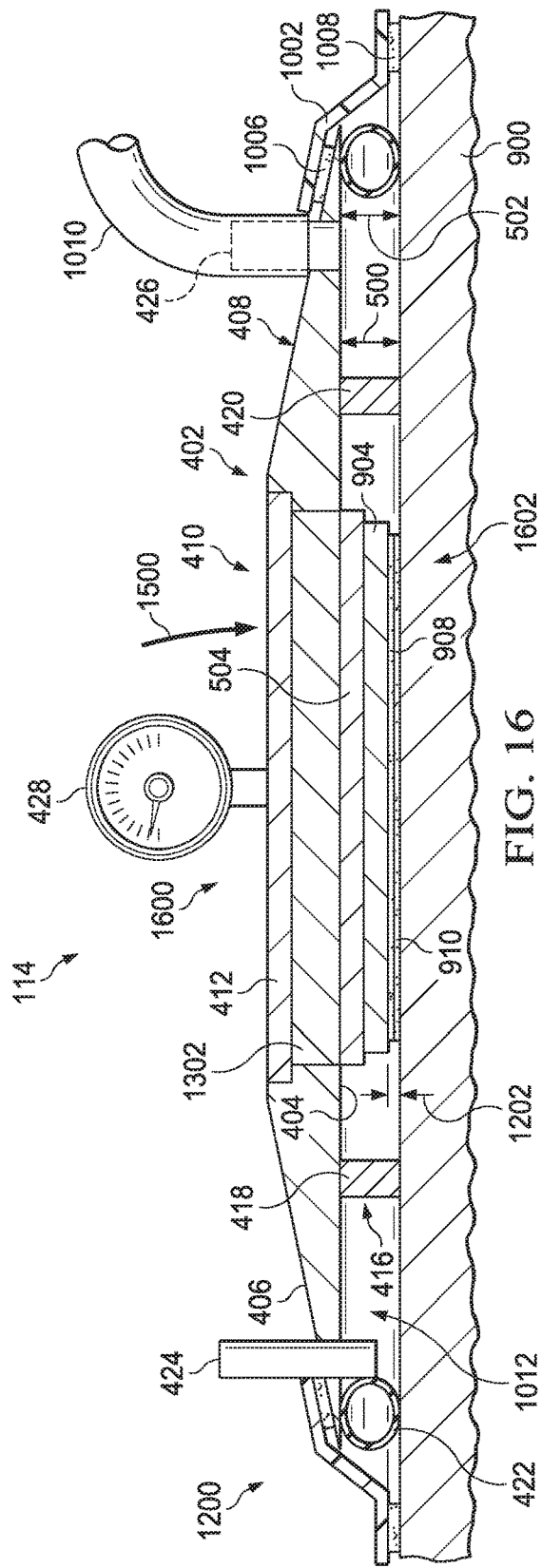
FIG. 16 is an illustration of a cross-sectional view of a vacuum debulking tool with a cover plate in a closed position in accordance with an illustrative embodiment.

In FIG. 16, an illustration of a cross-sectional view of a vacuum debulking tool with a cover plate in a closed position is depicted in accordance with an illustrative embodiment. In this view, vacuum debulking tool 114 from FIG. 15 is shown with cover plate 412 in closed position 1600. In particular, cover plate 412 has been moved in the direction of arrow 1500 to closed position 1600.

As shown, cover plate 412 lies substantially flush with second surface 406 of housing 402 of vacuum debulking tool 114. Closed position 1600 of cover plate 412 may seal cavity 410 of housing 402 such that little or no heat escapes through cover plate 412.

In this illustrative example, heat is transferred from heat source 1302 in cavity 410 through carrier plate 504. A vacuum may be drawn on chamber 1012. Adhesive 908 and adhesive 910 may be cured by the heat from heat source 1302 and pressure from the vacuum drawn on chamber 1012. In this manner, bonded joint 1602 is formed between patch 904 and second workpiece 900.

Figure 17:
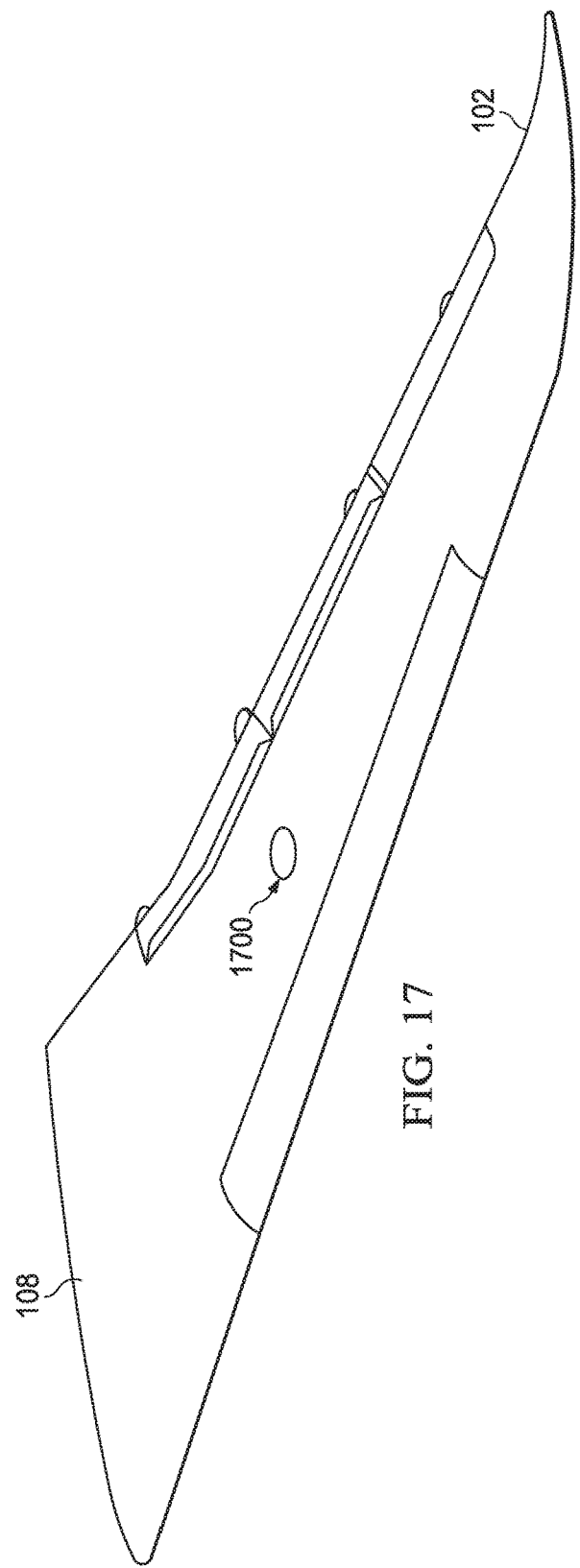
FIG. 17 is an illustration of a bonding environment in accordance with an illustrative embodiment.

Turning next to FIG. 17, an illustration of a bonding environment is depicted in accordance with an illustrative embodiment. In this example, wing 102 of aircraft 106 from FIG. 1 is shown with patch 1700. Patch 1700 has been formed using vacuum debulking tool 114 as described above.

With the use of vacuum debulking tool 114 to rework surface 108 of wing 102, the bonded joint formed between patch 1700 and surface 108 of wing 102 may have the desired mechanical properties. For example, patch 1700 may last longer and may be stronger than patches applied using other methods.

Additionally, because vacuum debulking tool 114 may be moved along wing 102 to debulk and cure patch 1700, maintenance time for aircraft 106 may be reduced. As a result, aircraft 106 may return to service more quickly than with previously used methods for aircraft rework.

The different components shown in FIGS. 4-17 may be illustrative examples of how components shown in block form in FIG. 2 and FIG. 3 can be implemented as physical structures. Additionally, some of the components in FIGS. 4-17 may be combined with components in FIG. 2 and FIG. 3, used with components in FIG. 2 and FIG. 3, or a combination of the two.

Figure 18:
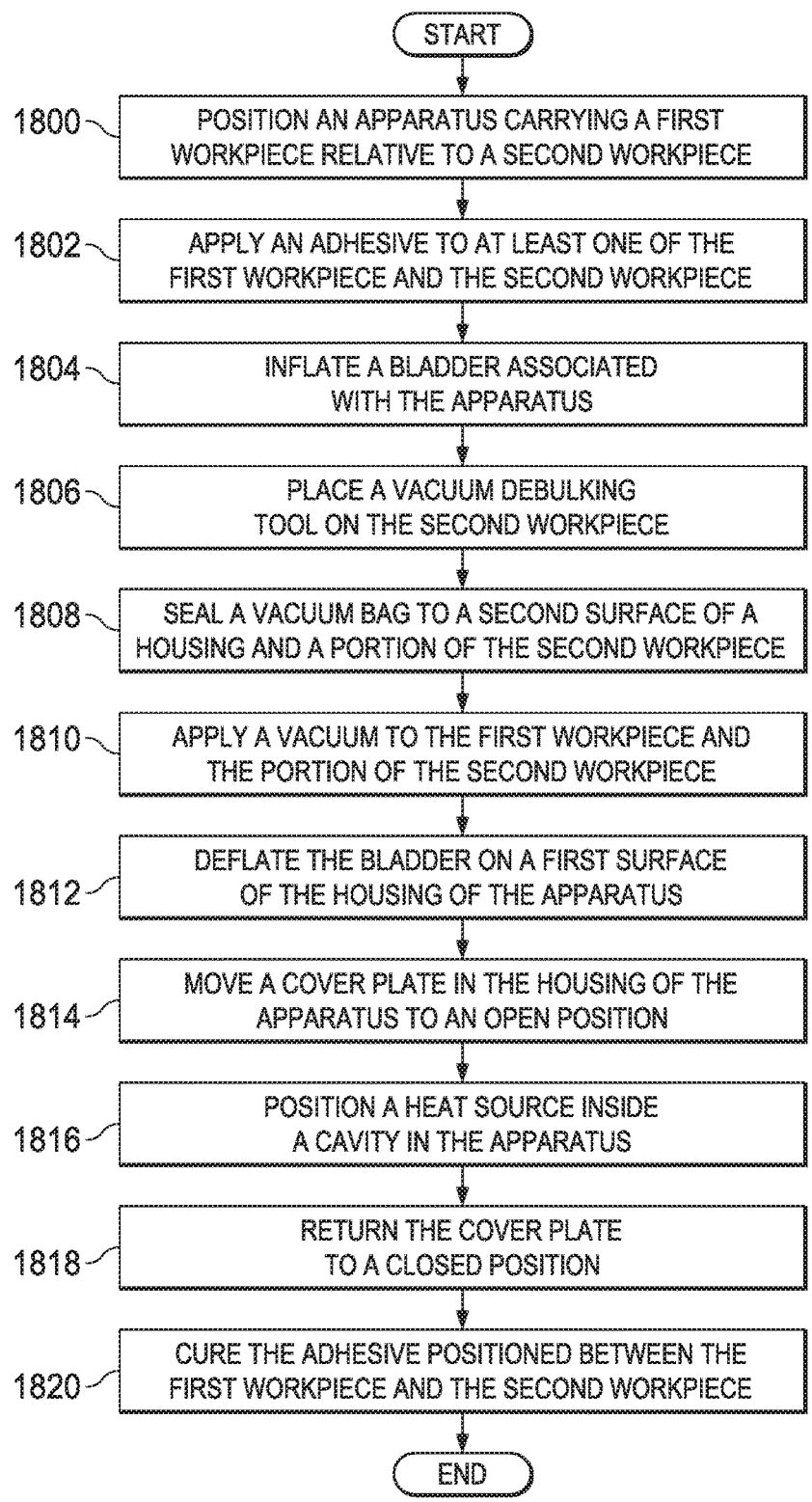
FIG. 18 is an illustration of a flowchart of a process for forming a bonded joint in accordance with an illustrative embodiment.

With reference now to FIG. 18, an illustration of a flowchart of a process for forming a bonded joint is depicted in accordance with an illustrative embodiment. The process illustrated in FIG. 18 may be implemented using vacuum debulking tool 114 as shown in FIGS. 4-16.

The process begins by positioning an apparatus carrying a first workpiece relative to a second workpiece (operation 1800). For example, vacuum debulking tool 114 carrying first workpiece 902 may be positioned over portion 906 of second workpiece 900 that needs rework in FIG. 9.

Next, an adhesive is applied to at least one of the first workpiece and the second workpiece (operation 1802). As an example, adhesive 908 may be applied to first workpiece 902, while adhesive 910 may be applied to second workpiece 900 in FIG. 9.

A bladder associated with the apparatus is then inflated (operation 1804). For example, bladder 422 is inflated such that second distance 502 is greater than first distance 500 in FIG. 8. In other words, number of standoffs 416 may not touch the surface of second workpiece 900.

The process then places a vacuum debulking tool on the second workpiece (operation 1806). In this example, bladder 422 may be positioned in inflated state 800 in FIG. 8.

Thereafter, a vacuum bag may be sealed to a second surface of a housing and a portion of the second workpiece (operation 1808). As an example, vacuum bag 1002 may be sealed to second surface 406 of housing 402 and a portion of the upper surface of second workpiece 900 in FIG. 10.

A vacuum may then be applied to the first workpiece and the portion of the second workpiece (operation 1810). For instance, a vacuum may be drawn on chamber 1012 formed by housing 402, first workpiece 902, and the upper surface of second workpiece 900 in FIG. 10. In this example, the vacuum is applied to patch 904 with adhesive 908 and portion 906 of second workpiece 900 to remove air and other gases from adhesive 908 and adhesive 910 such that undesired porosity and voids may be removed from adhesive 908 and adhesive 910. The vacuum may be applied through vacuum port 426.

Next, the bladder is deflated on a first surface of the housing of the apparatus (operation 1812). In this example, bladder 422 is deflated such that second distance 502 is less than first distance 500. Deflating bladder 422 positions first workpiece 902 such that adhesive 908 and adhesive 910 having desired thickness 1202 are positioned between first workpiece 902 and second workpiece 900 in FIG. 12. In operation 1812, number of standoffs 416 touch second workpiece 900 such that desired thickness 1202 of adhesive 908 and adhesive 910 is provided when patch 904 with adhesive 908 and adhesive 910 on second workpiece 900 is cured.

A cover plate in the housing of the apparatus is then moved to an open position (operation 1814). For instance, cover plate 412 in housing 402 is moved to open position 1300 in FIG. 13. Thereafter, a heat source is positioned inside a cavity in the apparatus (operation 1816). For example, heat source 1302 may be positioned inside cavity 410 of housing 402.

The process then returns the cover plate to a closed position (operation 1818). In this example, cover plate 412 is moved to closed position 1600 in FIG. 16.

Next, the adhesive positioned between the first workpiece and the second workpiece is cured (operation 1820), with the process terminating thereafter. The curing of the adhesive includes heating the adhesive with a carrier plate attached to the first surface of the housing.

In operation 1820, heat source 1302 is activated. Adhesive 908 and adhesive 910 are heated with carrier plate 504 attached to first surface 404 of housing 402. The heat from heat source 1302 is used to cure adhesive 908 and adhesive 910 in a desired manner. Number of standoffs 416 provide that desired thickness 1202 is maintained throughout the process. In this manner, a bonded joint with desired thickness 1202 may be formed without undesired porosity or voids being left in the bondline.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 19:
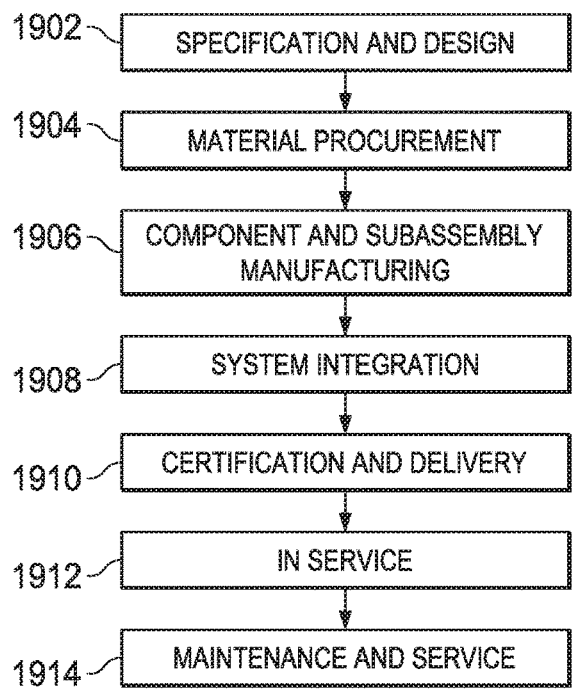
FIG. 19 is an illustration of a block diagram of an aircraft manufacturing and service method in accordance with an illustrative embodiment.
Figure 20:
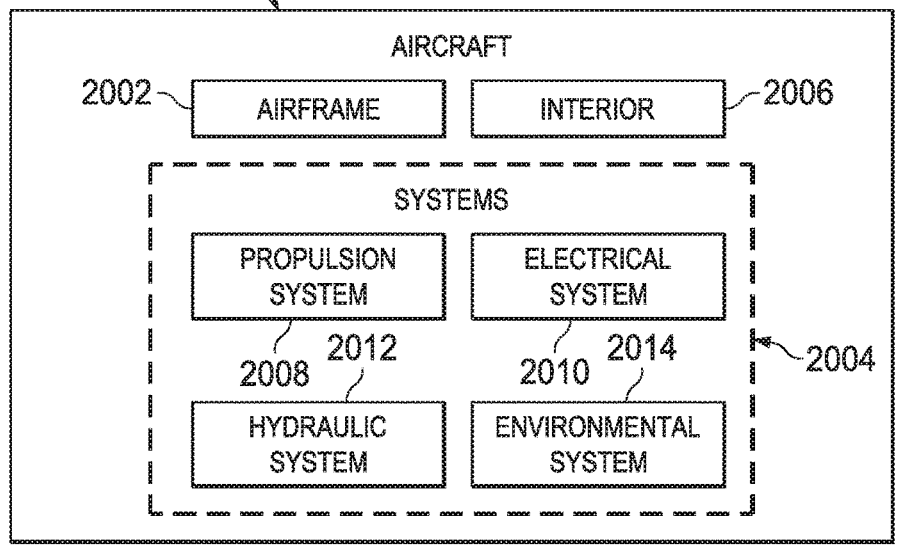
FIG. 20 is an illustration of a block diagram of an aircraft in which an illustrative embodiment may be implemented.

Illustrative embodiments of the disclosure may be described in the context of aircraft manufacturing and service method 1900 as shown in FIG. 19 and aircraft 2000 as shown in FIG. 20. Turning first to FIG. 19, an illustration of a block diagram of an aircraft manufacturing and service method is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 may go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of a block diagram of an aircraft is depicted in which an illustrative embodiment may be implemented. In this example, aircraft 2000 is produced by aircraft manufacturing and service method 1900 in FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900 in FIG. 19. In particular, vacuum debulking tool 212 from FIG. 2 may be used during any one of the stages of aircraft manufacturing and service method 1900. For example, without limitation, vacuum debulking tool 212 from FIG. 2 may be used to form bonded joint 222 between patch 208 and second workpiece 206 during at least one of component and subassembly manufacturing 1906, system integration 1908, routine maintenance and service 1914, or some other stage of aircraft manufacturing and service method 1900.

With the use of vacuum debulking tool 212, composite parts in aircraft 2000 may be salvaged rather than replaced during component and subassembly manufacturing 1906. For instance, if a composite part does not meet manufacturing or testing requirements, vacuum debulking tool 212 may be used to rework the part. In this manner, composite parts may be discarded less frequently than with some currently used rework methods. As a result, the use of vacuum debulking tool 212 may decrease the cost of manufacturing aircraft 2000.

In one illustrative example, components or subassemblies produced in component and subassembly manufacturing 1906 in FIG. 19 may be fabricated or manufactured in a manner similar to components or subassemblies produced while aircraft 2000 is in service 1912 in FIG. 19. As yet another example, one or more apparatus embodiments, method embodiments, or a combination thereof may be utilized during production stages, such as component and subassembly manufacturing 1906 and system integration 1908 in FIG. 19.

One or more apparatus embodiments, method embodiments, or a combination thereof may be utilized while aircraft 2000 is in service 1912 and/or during maintenance and service 1914 in FIG. 19. For instance, vacuum debulking tool 212 can be used during maintenance and service 1914 to rework inconsistencies that may occur during in service 1912. During maintenance and service 1914, composite parts may be reworked for upgrades, refurbishment, or other operations that may be performed during maintenance and service 1914. The use of a number of the different illustrative embodiments may substantially expedite the assembly of and/or reduce the cost of aircraft 2000.

Thus, the illustrative embodiments provide a method and apparatus for forming bonded joint 222. Apparatus 202 carrying first workpiece 204 is positioned relative to second workpiece 206. A vacuum is applied to first workpiece 204 and a portion of second workpiece 206. Bladder 306 is deflated on first surface 312 of housing 300 of apparatus 202. Deflating bladder 306 positions first workpiece 204 such that adhesive 218 having desired thickness 226 is positioned between first workpiece 204 and second workpiece 206. Adhesive 218 positioned between first workpiece 204 and second workpiece 206 is cured.

With the use of an illustrative embodiment, reworks may be made to composite structures without removing composite parts to rework each composite part. In a similar fashion, rework may be completed on metal structures as well.

Moreover, debulking and curing of adhesive to form a bonded joint may be completed during one step and with one tool. As a result, voids and porosity at the bonded joint may be reduced, therefore increasing the reliability and life of the bonded joint.

The illustrative embodiments may further provide a repeatable process resulting in consistent void-free adhesive bondlines for metal and composite patches. In this manner, an illustrative embodiment may provide an efficient and cost effective tool to rework composite structures having inconsistencies.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a housing having a first surface and a second surface;
   a number of standoffs associated with the first surface of the housing, the number of standoffs configured to extend a first distance outwardly from the first surface;
   a bladder attached to the first surface of the housing, wherein the bladder is configured to extend a second distance from the first surface, wherein the second distance is shorter than the first distance of the number of standoffs when the bladder is in a deflated state; and
   a carrier plate attached to the first surface of the housing.

2. The apparatus of claim 1, wherein the second distance is a greater distance from the second surface than the first distance of the number of standoffs when the bladder is in an inflated state.

3. The apparatus of claim 1, wherein the first distance of the number of standoffs is adjustable relative to the first surface of the housing.

4. The apparatus of claim 1, wherein the number of standoffs is configured to be detached from the first surface of the housing.

5. The apparatus of claim 1, wherein the bladder is configured to position the housing relative to a workpiece.

6. The apparatus of claim 1, wherein the housing comprises:
a body having a cavity.

7. The apparatus of claim 6, further comprising:
a heat source positioned within the cavity.

8. The apparatus of claim 1, further comprising:
a number of vacuum ports extending from the first surface of the housing to the second surface of the housing.

9. The apparatus of claim 1, wherein the carrier plate is comprised of a thermally conductive material and is configured to be heated.

10. An apparatus comprising:
a housing having a number of vacuum ports, the number of vacuum ports extending from a second surface of the housing to a first surface of the housing, the housing comprising:
a body having a cavity; and
a cover plate, wherein the cover plate is configured to cover the cavity and lie flush with the body;
a number of standoffs associated with the first surface of the housing, the number of standoffs configured to extend outwardly a first distance from the first surface;
a bladder attached to the first surface of the housing, the bladder configured to extend a second distance from the first surface, wherein the second distance is a shorter distance than the first distance of the number of standoffs when the bladder is in a deflated state;
a carrier plate attached to the first surface of the housing, wherein the carrier plate is comprised of a thermally conductive material and configured to be heated; and
a vacuum bag sealed to the second surface of the housing and a workpiece.

11. The apparatus of claim 6, wherein the housing further comprises:
a cover plate, wherein the cover plate is configured to cover the cavity and lie flush with the body.

12. The apparatus of claim 11, wherein the cover plate is further configured to move between an open position and a closed position.

13. The apparatus of claim 8, further comprising:
a vacuum bag sealed to the second surface of the housing and a workpiece.

14. The apparatus of claim 10, wherein the second distance is a greater distance from the second surface than the first distance of the number of standoffs when the bladder is in an inflated state.

15. The apparatus of claim 10, wherein the first distance of the number of standoffs is adjustable relative to the first surface of the housing.

16. The apparatus of claim 10, wherein the number of standoffs is configured to be detached from the first surface of the housing.

17. The apparatus of claim 10, wherein the bladder is configured to position the housing relative to the workpiece.

18. The apparatus of claim 10, further comprising:
a heat source positioned within the cavity.

19. The apparatus of claim 10, wherein the cover plate is further configured to move between an open position and a closed position.

* * * * *